US009208698B2

(12) United States Patent
Chen et al.

(10) Patent No.: US 9,208,698 B2
(45) Date of Patent: Dec. 8, 2015

(54) DEVICE, METHOD, AND GRAPHICAL USER INTERFACE FOR MANIPULATING A THREE-DIMENSIONAL MAP VIEW BASED ON A DEVICE ORIENTATION

(75) Inventors: Billy Chen, Santa Clara, CA (US); Chris Blumenberg, San Francisco, CA (US); Patrick Steven Piemonte, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 13/536,677

(22) Filed: Jun. 28, 2012

(65) Prior Publication Data
US 2013/0162534 A1   Jun. 27, 2013

Related U.S. Application Data

(60) Provisional application No. 61/580,577, filed on Dec. 27, 2011.

(51) Int. Cl.
*G09B 29/10* (2006.01)
*G06F 3/0346* (2013.01)

(52) U.S. Cl.
CPC ............ *G09B 29/106* (2013.01); *G06F 3/0346* (2013.01)

(58) Field of Classification Search
CPC ...................................... G06F 3/0346
USPC .................................. 345/173–179
See application file for complete search history.

(56) References Cited

U.S. PATENT DOCUMENTS

| 6,901,561 B1 | 5/2005 | Kirkpatrick et al. |
| 7,567,844 B2 | 7/2009 | Thomas et al. |
| 8,487,957 B1 | 7/2013 | Bailly et al. |
| 8,624,797 B2 | 1/2014 | Lee et al. |

(Continued)

FOREIGN PATENT DOCUMENTS

| CN | 1995917 A | 7/2007 |
| CN | 102187309 A | 9/2011 |

(Continued)

OTHER PUBLICATIONS

Wikipedia, "Google Earth," Wikipedia, the Free Encyclopedia, last modified Feb. 4, 2014, http://en.wikipedia.org/wiki/Google_Earth 14 pages.

(Continued)

*Primary Examiner* — Kevin M Nguyen
*Assistant Examiner* — Cory Almeida
(74) *Attorney, Agent, or Firm* — Morrison & Foerster LLP

(57) ABSTRACT

An electronic device displays on a display a first three-dimensional map view of a respective map location. The first three-dimensional map view is viewed from a first angle while an orientation of the electronic device corresponds to a first orientation. The electronic device detects a rotation of the electronic device with at least one orientation sensor, and determines a respective orientation of the electronic device. The respective orientation is distinct from the first orientation. While detecting the rotation of the electronic device, the electronic device updates the first three-dimensional map view with a respective three-dimensional map view of the respective map location. The respective three-dimensional map view is viewed from a respective angle distinct from the first angle. The respective angle is determined in accordance with the respective orientation of the electronic device.

25 Claims, 19 Drawing Sheets

(56) References Cited

U.S. PATENT DOCUMENTS

| | | |
|---|---|---|
| 2001/0048423 A1* | 12/2001 | Rekimoto ............... 345/157 |
| 2003/0025812 A1 | 2/2003 | Slatter et al. |
| 2004/0236507 A1 | 11/2004 | Maruyama et al. |
| 2006/0170791 A1 | 8/2006 | Porter et al. |
| 2007/0219645 A1 | 9/2007 | Thomas et al. |
| 2009/0167702 A1* | 7/2009 | Nurmi ..................... 345/173 |
| 2009/0167890 A1 | 7/2009 | Nakagomi et al. |
| 2010/0005390 A1 | 1/2010 | Bong |
| 2010/0020222 A1 | 1/2010 | Jones et al. |
| 2010/0045666 A1 | 2/2010 | Kornmann et al. |
| 2010/0136957 A1* | 6/2010 | Horodezky et al. ...... 455/414.2 |
| 2010/0141786 A1 | 6/2010 | Bigioi et al. |
| 2011/0069018 A1 | 3/2011 | Atkins et al. |
| 2011/0090155 A1 | 4/2011 | Caskey et al. |
| 2011/0141141 A1 | 6/2011 | Kankainen |
| 2011/0164163 A1* | 7/2011 | Bilbrey et al. ........ 348/333.01 |
| 2011/0258537 A1 | 10/2011 | Rives et al. |
| 2012/0106790 A1 | 5/2012 | Sultana et al. |
| 2012/0223936 A1 | 9/2012 | Aughey et al. |
| 2012/0316782 A1 | 12/2012 | Sartipi et al. |
| 2013/0063488 A1 | 3/2013 | Gaebler et al. |

FOREIGN PATENT DOCUMENTS

| | | |
|---|---|---|
| EP | 1926075 A2 | 5/2008 |
| EP | 2385500 A2 | 11/2011 |

OTHER PUBLICATIONS

Notice of Allowance received for U.S. Appl. No. 12/764,360, mailed on Oct. 1, 2012, 13 pages.
Non-Final Office Action received for U.S. Appl. No. 13/710,375, mailed on Jul. 18, 2014, 8 pages.
Notice of Allowance received for U.S. Appl. No. 13/710,375, mailed on Jan. 7, 2015, 7 pages.
Office Action received for Chinese Patent Application No. 201210435870.2, mailed on May 29, 2015, 12 pages (4 pages of Official Copy and 8 pages of English Translation).
Extended European Search Report (includes Partial European Search Report and European Search Opinion) received for European Patent Application No. 12187992.8, mailed on Jul. 6, 2015, 5 pages.
Office Action received for Chinese Patent Application No. 201210563026.8, mailed on May 26, 2015, 27 pages (16 pages Of English Translation and 11 pages of Official Copy).

* cited by examiner

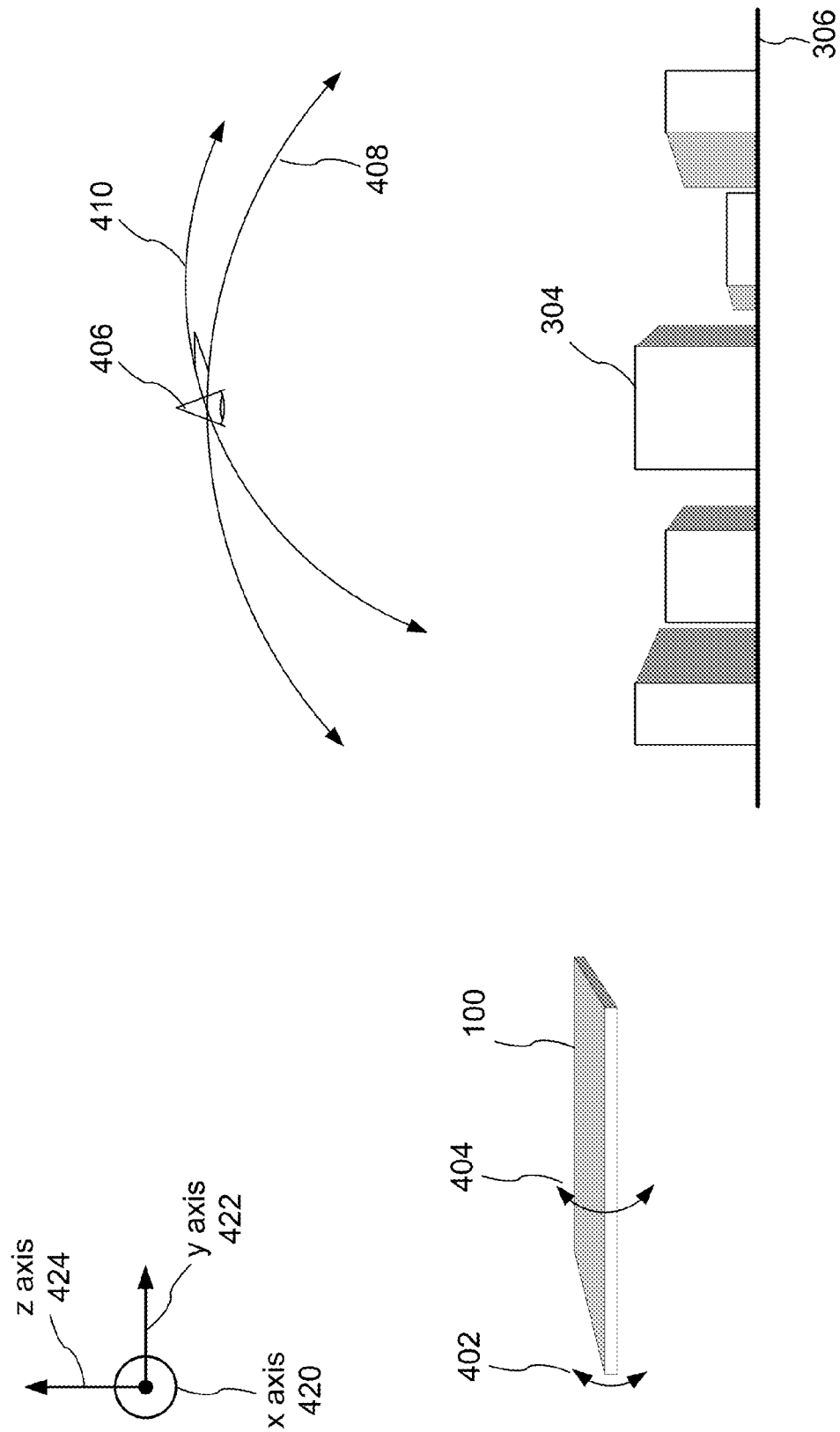

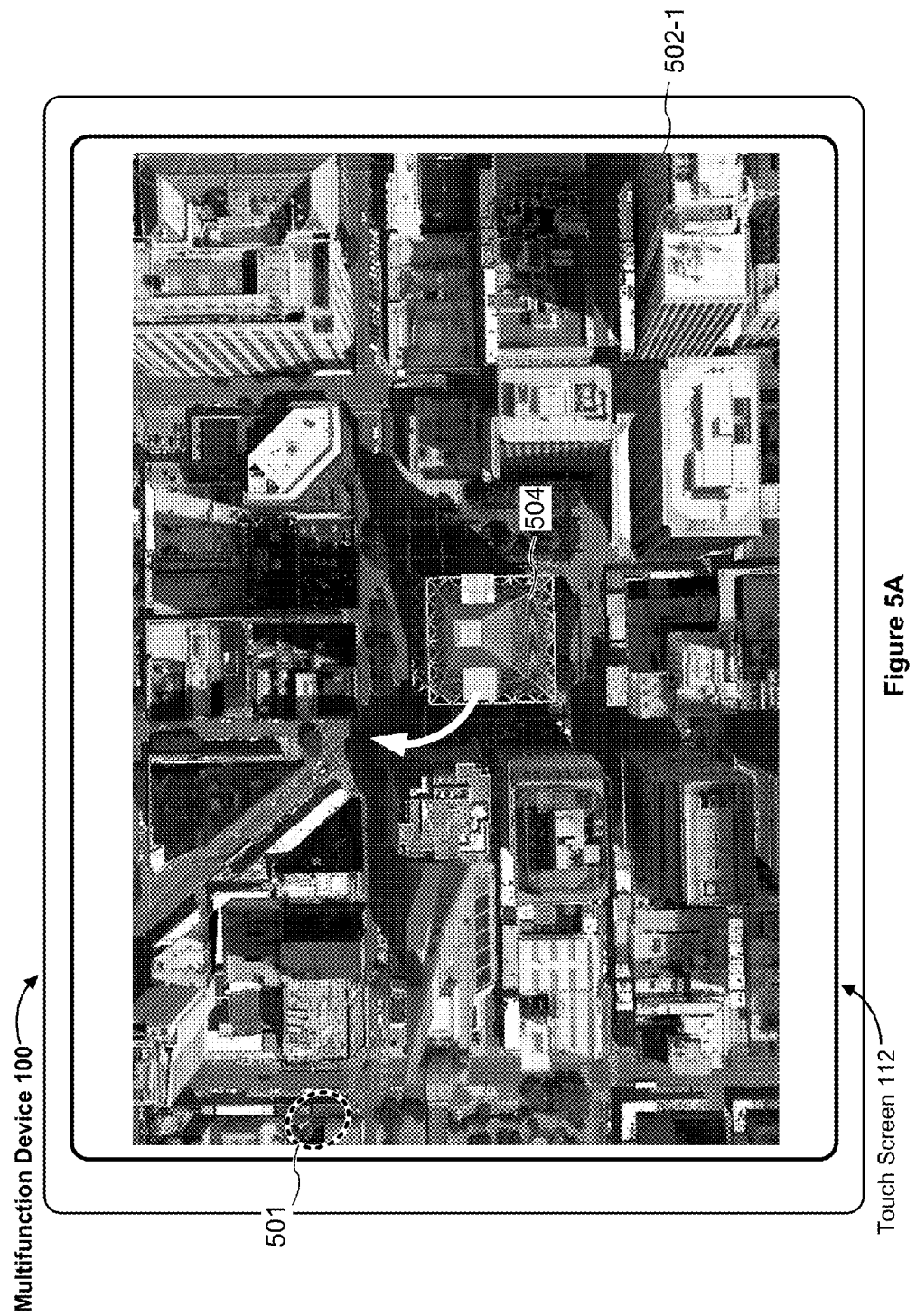

618 The electronic device includes a touch-sensitive surface.
While displaying the first three-dimensional map view on the display, detect a predefined gesture on the touch-sensitive surface. While detecting the predefined gesture on the touch-sensitive surface, enter a map rotation mode. While in the map rotation mode, detect the rotation of the electronic device with at least one of one or more orientation sensors, and determine the respective orientation of the electronic device. The respective orientation is distinct from the first orientation.
While detecting the rotation of the electronic device, update the first three-dimensional map view with the respective three-dimensional map view of the respective map location. The respective three-dimensional map view is viewed from the respective angle distinct from the first angle. The respective angle is determined in accordance with the respective orientation of the electronic device.

620 Detect termination of the predefined gesture on the touch-sensitive surface; and, in response to detecting the termination of the predefined gesture on the touch-sensitive surface, exit the map rotation mode.

622 The first three-dimensional map view is displayed in one of a portrait orientation and a landscape orientation. While in the map rotation mode, detect a rotation of the electronic device from the one of the portrait orientation and the landscape orientation to the other of the portrait orientation and the landscape orientation, and maintain display of the respective three-dimensional map view in the one of the portrait orientation and the landscape orientation despite the rotation of the electronic device from the one of the portrait orientation and the landscape orientation to the other of the portrait orientation and the landscape orientation. In response to exiting from the map rotation mode, replace the respective three-dimensional map view with a rotated three-dimensional map view of the respective map location. The rotated three-dimensional map view is viewed from the respective angle distinct from the first angle. The rotated three-dimensional map view is in the other of the portrait orientation and the landscape orientation.

Figure 6B

DEVICE, METHOD, AND GRAPHICAL USER INTERFACE FOR MANIPULATING A THREE-DIMENSIONAL MAP VIEW BASED ON A DEVICE ORIENTATION

RELATED APPLICATIONS

This application claims priority to U.S. Provisional Application Ser. No. 61/580,577, filed Dec. 27, 2011, which is incorporated by reference herein in its entirety.

TECHNICAL FIELD

This relates generally to electronic devices, including but not limited to electronic devices with touch-sensitive surfaces that display three-dimensional maps.

BACKGROUND

The use of electronic devices for displaying maps has increased significantly in recent years. Exemplary electronic devices include navigation devices (e.g., global positioning system devices) as well as multipurpose devices (e.g., desktops, laptops, tablets, and smart phones).

But existing methods for manipulating three-dimensional maps are cumbersome and inefficient. For example, using a sequence of mouse inputs or keyboard inputs to move, rotate, tilt, and otherwise adjust a map view is tedious and creates a significant cognitive burden on a user. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating a viewpoint in a three-dimensional map. Such methods and interfaces may complement or replace conventional methods for manipulating a viewpoint in a three-dimensional map. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices are reduced or eliminated by the disclosed devices. In some embodiments, the device is a desktop computer or a gaming computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, in addition to manipulating three-dimensional maps, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and one or more orientation sensors. The method includes displaying on the display a first three-dimensional map view of a respective map location, wherein the first three-dimensional map view is viewed from a first angle while an orientation of the electronic device corresponds to a first orientation. The method also includes detecting a rotation of the electronic device with at least one of the one or more orientation sensors, and determining a respective orientation of the electronic device, wherein the respective orientation is distinct from the first orientation. The method further includes, while detecting the rotation of the electronic device, updating the first three-dimensional map view with a respective three-dimensional map view of the respective map location, wherein the respective three-dimensional map view is viewed from a respective angle distinct from the first angle. The respective angle is determined in accordance with the respective orientation of the electronic device.

In accordance with some embodiments, an electronic device includes a display, one or more orientation sensors, one or more processors, memory, and one or more programs. The one or more programs are stored in the memory and configured to be executed by the one or more processors. The one or more programs include instructions for displaying on the display a first three-dimensional map view of a respective map location, wherein the first three-dimensional map view is viewed from a first angle while an orientation of the electronic device corresponds to a first orientation. The one or more programs also include instructions for detecting a rotation of the electronic device with at least one of the one or more orientation sensors, and determining a respective orientation of the electronic device, wherein the respective orientation is distinct from the first orientation. The one or more programs further include instructions for, while detecting the rotation of the electronic device, updating the first three-dimensional map view with a respective three-dimensional map view of the respective map location, wherein the respective three-dimensional map view is viewed from a respective angle distinct from the first angle. The respective angle is determined in accordance with the respective orientation of the electronic device.

In accordance with some embodiments, a computer readable storage medium has stored therein instructions, which, when executed by an electronic device with one or more orientation sensors, cause the device to display on the display a first three-dimensional map view of a respective map location, wherein the first three-dimensional map view is viewed from a first angle while an orientation of the electronic device corresponds to a first orientation. The computer readable storage medium also includes instructions to detect a rotation of the electronic device with at least one of the one or more orientation sensors, and determine a respective orientation of the electronic device, wherein the respective orientation is distinct from the first orientation. The computer readable storage medium further includes instructions to, while detecting the rotation of the electronic device, update the first three-dimensional map view with a respective three-dimensional map view of the respective map location, wherein the respective three-dimensional map view is viewed from a respective angle distinct from the first angle. The respective angle is determined in accordance with the respective orientation of the electronic device.

In accordance with some embodiments, a graphical user interface on an electronic device with one or more orientation sensors, a memory, and one or more processors to execute one or more programs stored in the memory includes a first three-dimensional map view of a respective map location, wherein the first three-dimensional map view is viewed from a first angle while an orientation of the electronic device corresponds to a first orientation. In response to detecting a rotation of the electronic device with at least one of the one or more orientation sensors, a respective orientation of the electronic device is determined, wherein the respective orientation is distinct from the first orientation. While detecting the rotation of the electronic device, the first three-dimensional map view is updated with a respective three-dimensional map view of the respective map location, wherein the respective three-dimensional map view is viewed from a respective angle distinct from the first angle. The respective angle is determined in accordance with the respective orientation of the electronic device.

In accordance with some embodiments, an electronic device includes: a display; one or more orientation sensors; and means for displaying on the display a first three-dimensional map view of a respective map location, wherein the first three-dimensional map view is viewed from a first angle while an orientation of the electronic device corresponds to a first orientation. The electronic device also includes means for detecting a rotation of the electronic device with at least one of the one or more orientation sensors, and means for determining a respective orientation of the electronic device, wherein the respective orientation is distinct from the first orientation. The electronic device further includes means, enabled while detecting the rotation of the electronic device, for updating the first three-dimensional map view with a respective three-dimensional map view of the respective map location, wherein the respective three-dimensional map view is viewed from a respective angle distinct from the first angle. The respective angle is determined in accordance with the respective orientation of the electronic device.

In accordance with some embodiments, an information processing apparatus for use in an electronic device with a display and one or more orientation sensors includes means for displaying on the display a first three-dimensional map view of a respective map location, wherein the first three-dimensional map view is viewed from a first angle while an orientation of the electronic device corresponds to a first orientation. The information processing apparatus also includes means for detecting a rotation of the electronic device with at least one of the one or more orientation sensors, and means for determining a respective orientation of the electronic device, wherein the respective orientation is distinct from the first orientation. The information processing apparatus further includes means, enabled while detecting the rotation of the electronic device, for updating the first three-dimensional map view with a respective three-dimensional map view of the respective map location, wherein the respective three-dimensional map view is viewed from a respective angle distinct from the first angle. The respective angle is determined in accordance with the respective orientation of the electronic device.

In accordance with some embodiments, an electronic device includes a display unit configured to display a first three-dimensional map view of a respective map location, wherein the first three-dimensional map view is viewed from a first angle while an orientation of the electronic device corresponds to a first orientation. The electronic device also includes one or more orientation sensing units configured to detect a rotation of the electronic device and determine a respective orientation of the electronic device, wherein the respective orientation is distinct from the first orientation. The electronic device further includes a processing unit coupled to the display unit and the one or more orientation sensing units. The processing unit is configured to, while detecting the rotation of the electronic device, update the first three-dimensional map view with a respective three-dimensional map view of the respective map location, wherein the respective three-dimensional map view is viewed from a respective angle distinct from the first angle. The respective angle is determined in accordance with the respective orientation of the electronic device.

Thus, electronic devices with displays and orientation sensors are provided with faster, more efficient methods and interfaces for manipulating a viewpoint in a three-dimensional map, thereby increasing the effectiveness, efficiency, and user satisfaction with such devices. Such methods and interfaces may complement or replace conventional methods for manipulating a viewpoint in a three-dimensional map.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 4 illustrates changes to a viewpoint in a three-dimensional map based on a two-dimensional rotation of a device in accordance with some embodiments.

FIGS. 5A-5J illustrate exemplary user interfaces for manipulating a viewpoint in a three-dimensional map in accordance with some embodiments.

FIGS. 6A-6B are flow diagrams illustrating a method of manipulating a viewpoint in a three-dimensional map in accordance with some embodiments.

DESCRIPTION OF EMBODIMENTS

Many electronic devices have graphical user interfaces that can be used to display three-dimensional maps. Three-dimensional maps are useful for conveying map information that is not included in two-dimensional maps, such as heights of map objects (e.g., buildings) and side views of the map objects. Manipulating a view on a three-dimensional map typically requires a user to select multiple variables, for example, three location variables (e.g., a longitude, a latitude, and an altitude) representing a location of a viewpoint (e.g., a location of a virtual camera or viewer) and three orientation variables (e.g., yaw, roll, and pitch angles) representing a direction of the virtual camera/viewer. The selected view corresponds to a view seen from the viewpoint by the virtual camera/viewer in the direction of the virtual camera/viewer. Existing methods for manipulating a view on a three-dimensional map typically require a sequence of user inputs for navigating the three-dimensional map. For example, with existing methods, a user typically needs to move the viewpoint with a series of user inputs (e.g., a series of key strokes on a keyboard to move the viewpoint longitudinally and latitudinally, followed by an altitudinal movement). Thereafter, the user often needs to provide additional user inputs to adjust the direction of the virtual camera/viewer (e.g., with repeated key strokes to rotate the virtual camera/viewer). In some cases, the user may need to repeat moving the viewpoint and rotating the virtual camera/viewer until a desired view is selected. Furthermore, the center of the view often changes with the movement of the viewpoint and/or the changes to the direction of the virtual camera/viewer, making it difficult to seamlessly observe a particular location or feature in the three-dimensional map. In the embodiments described below, an improved method for manipulating a viewpoint is achieved by displaying a first three-dimensional map view of a respective map location viewed from a first angle. A rotation of the electronic device is detected with one or more orientation sensors associated with the electronic device, and the first three-dimensional map view is updated with a respective three-dimensional map view of the respective map location viewed from a respective angle determined in accordance with the rotation of the electronic device. This method streamlines the viewpoint selection based on the device rotation, thereby eliminating the need for extra, separate steps to select a viewpoint in a three-dimensional map.

Figure 1A:
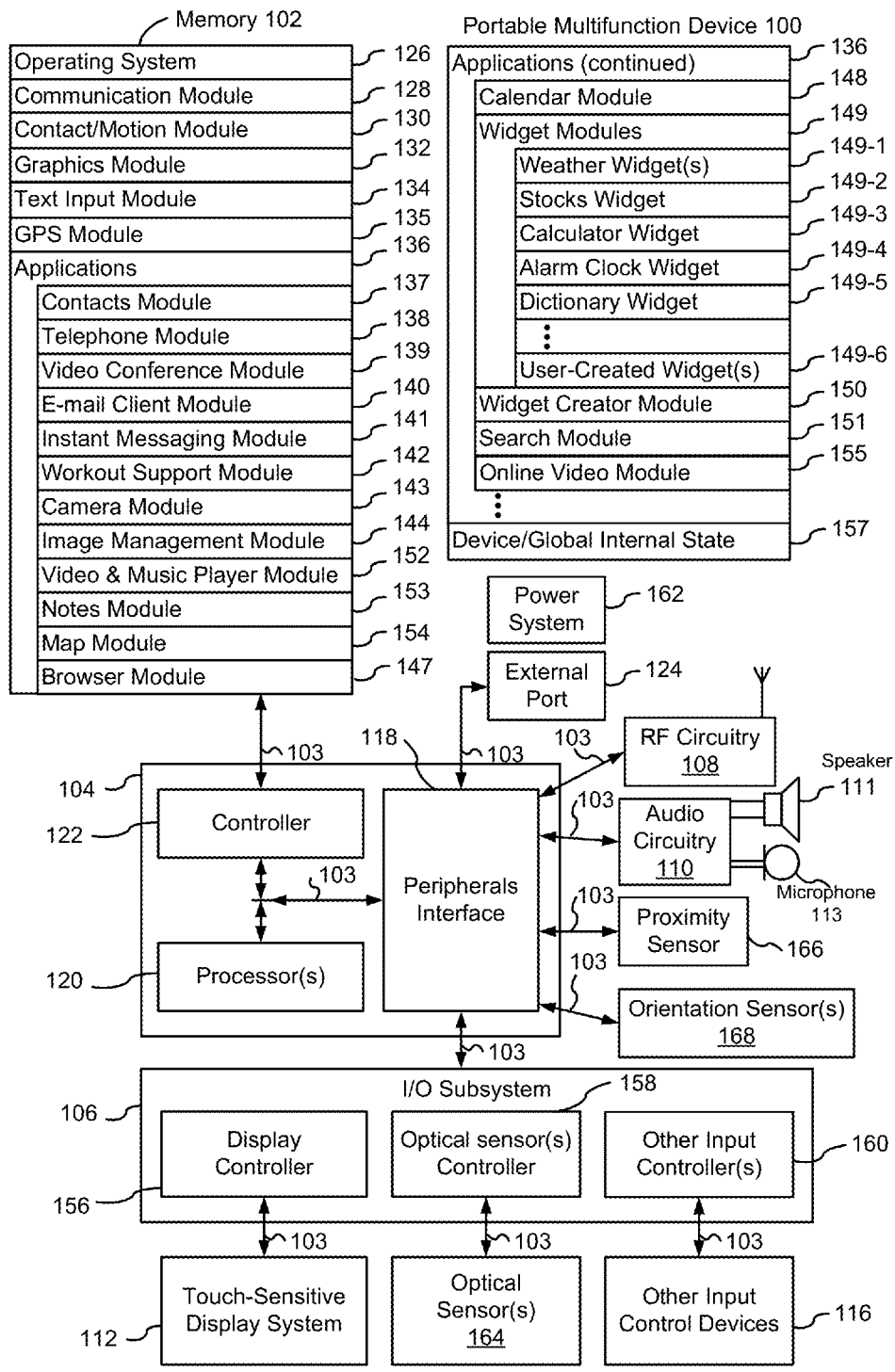
FIG. 1A is a block diagram illustrating a portable multifunction device with a touch-sensitive display in accordance with some embodiments.
Figure 1B:
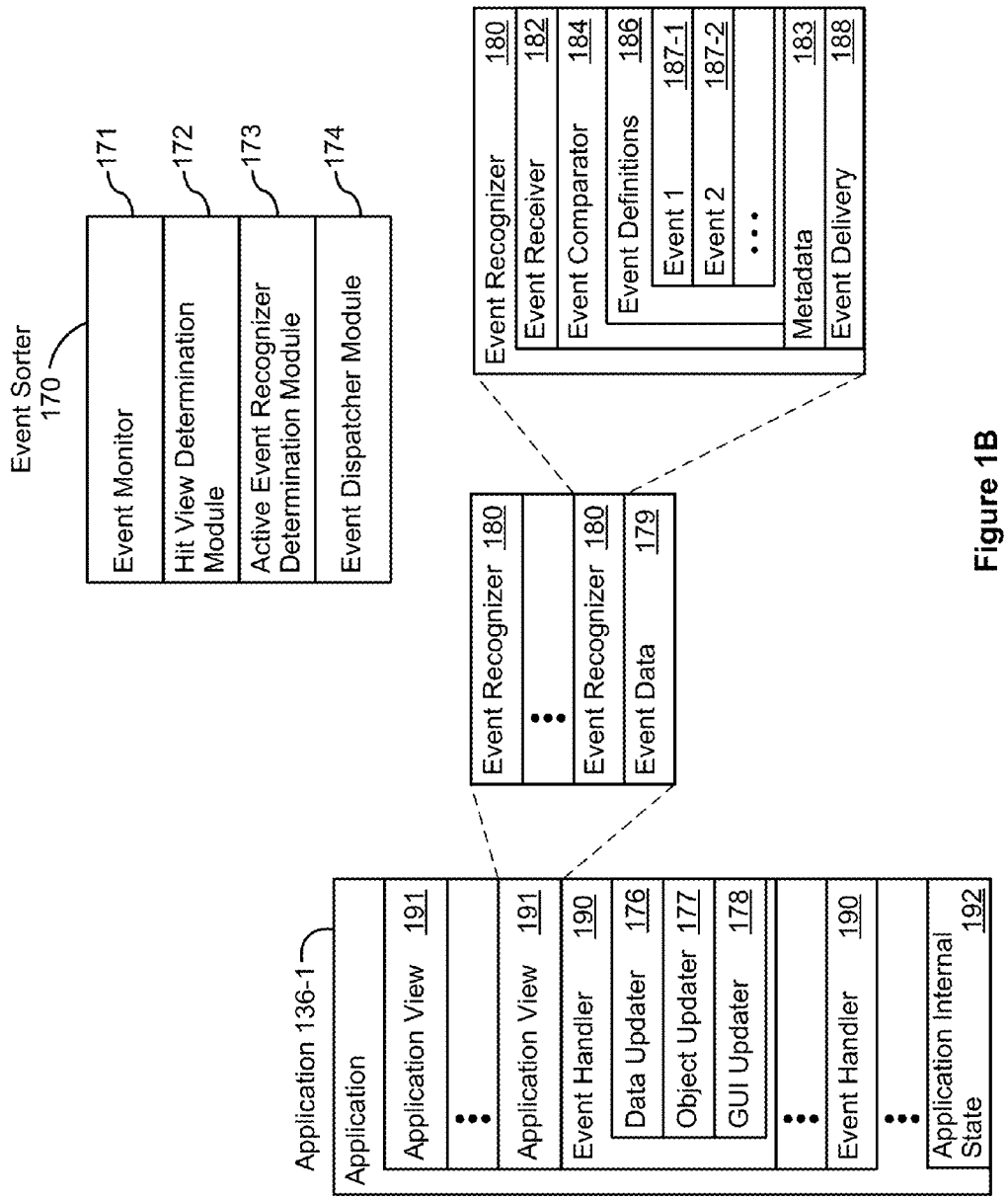
FIG. 1B is a block diagram illustrating exemplary components for event handling in accordance with some embodiments.
Figure 2:
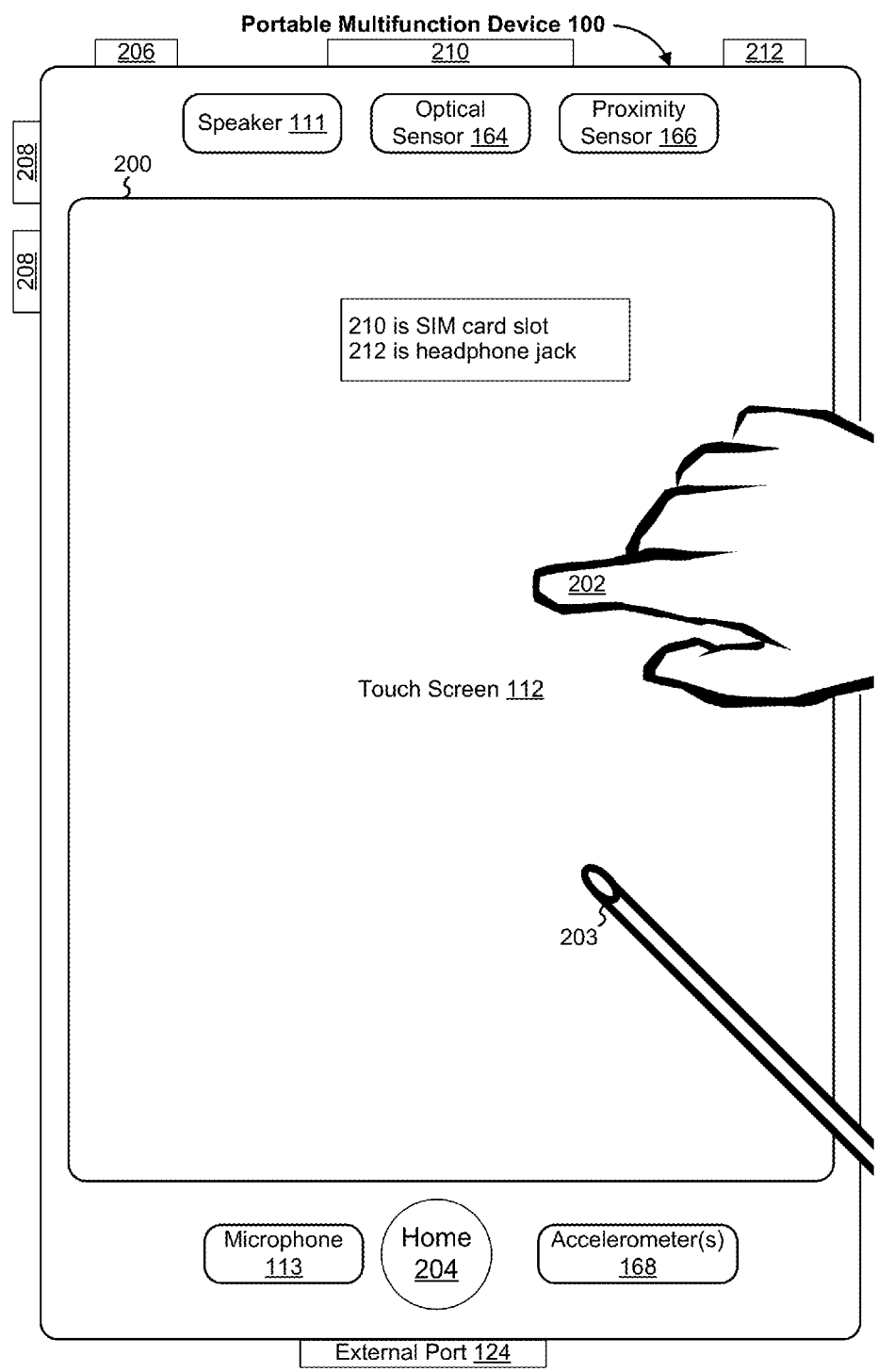
FIG. 2 illustrates a portable multifunction device having a touch screen in accordance with some embodiments.
Figure 3A:
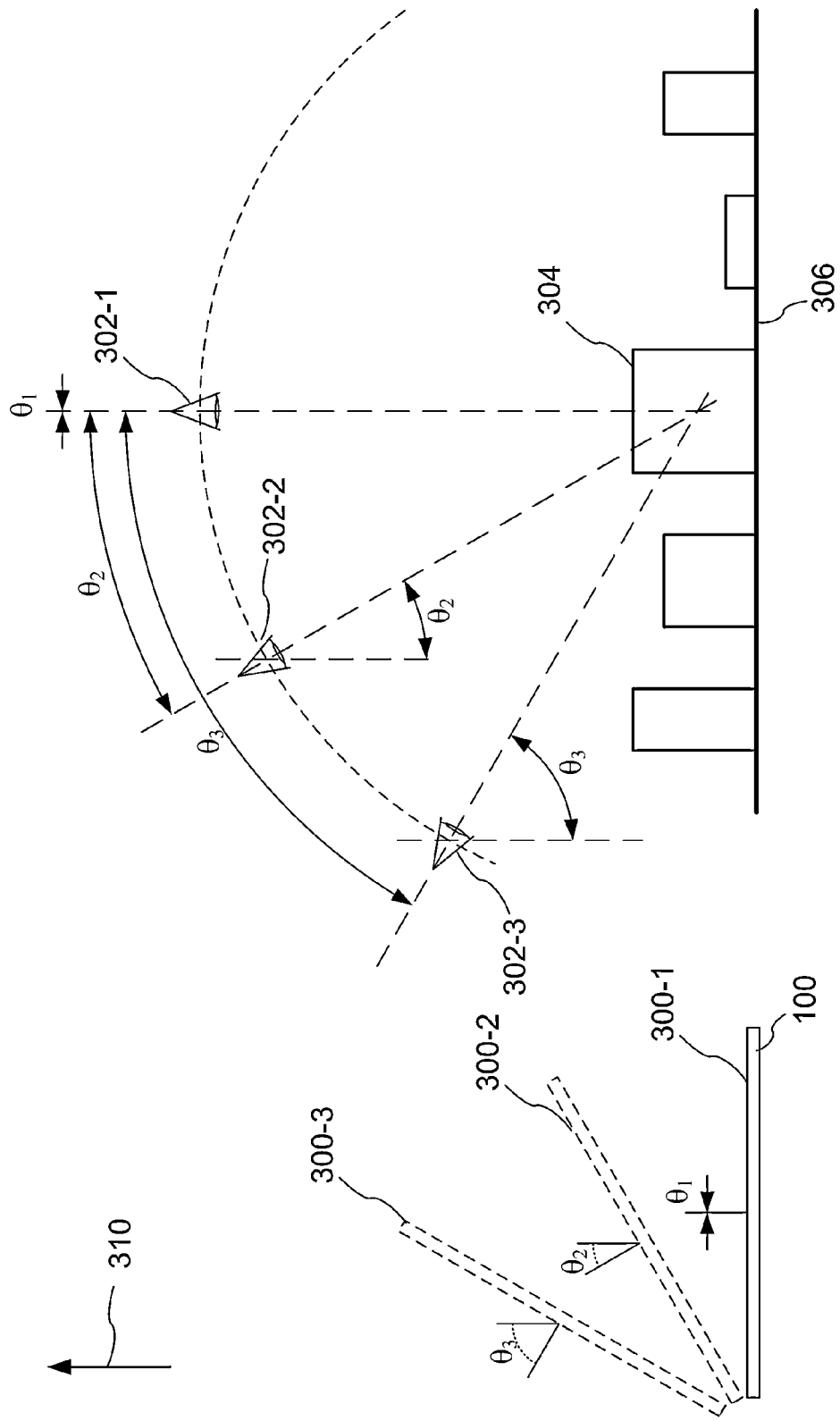
FIG. 3A illustrates changes to a viewpoint in a three-dimensional map based on a one-dimensional rotation of a device in accordance with some embodiments.
Figure 3B:
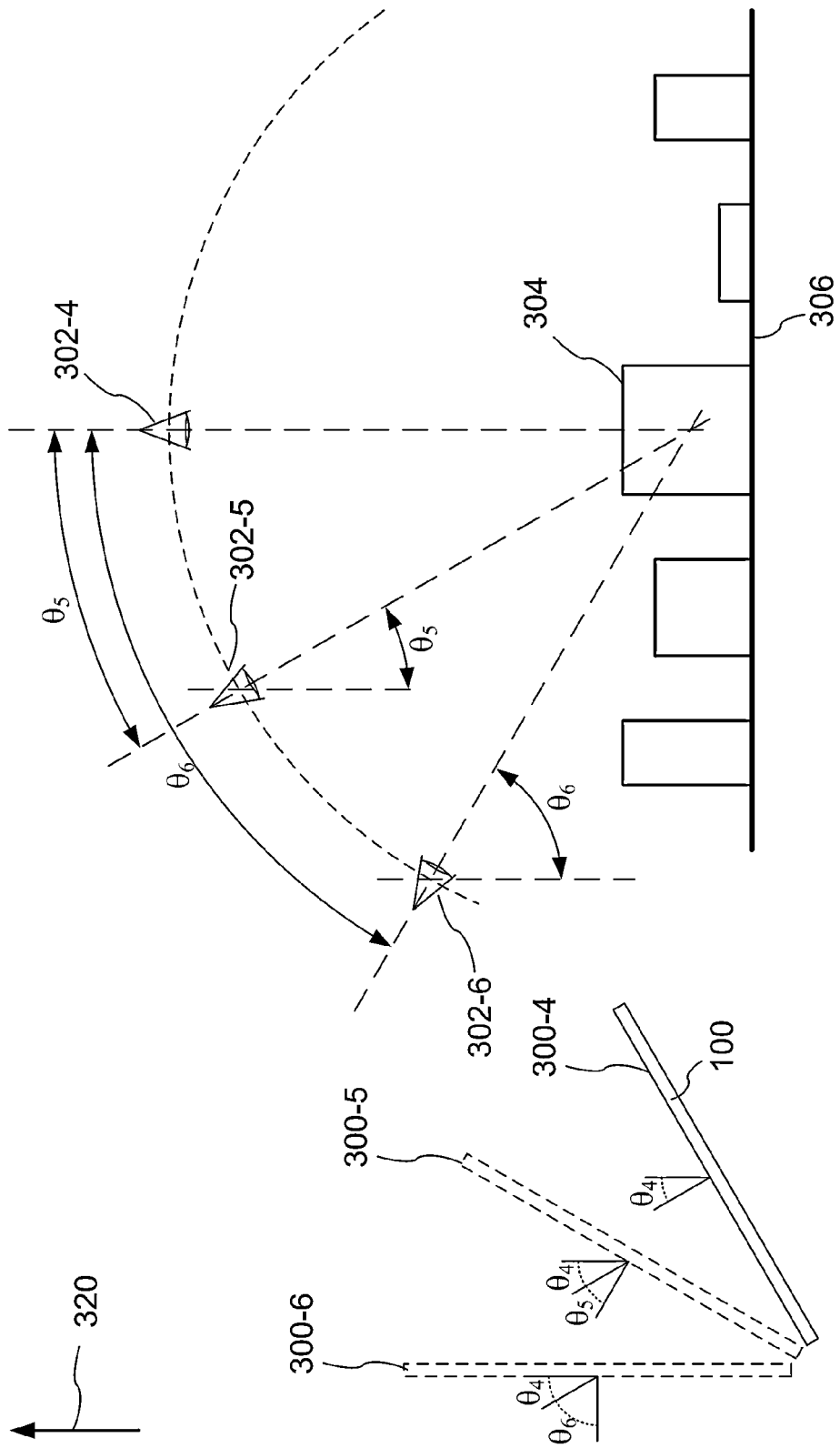
FIG. 3B illustrates changes to a viewpoint in a three-dimensional map based on a one-dimensional rotation of a device in accordance with some other embodiments.

Below, FIGS. 1A-1B and 2 provide a description of exemplary devices. FIGS. 3A-3B and 4 illustrate exemplary changes to a viewpoint based on the rotation of the device (i.e., changes to the device orientation). FIGS. 5A-5J illustrate exemplary user interfaces for manipulating a viewpoint in a three-dimensional map. FIGS. 6A-6B are flow diagrams illustrating a method of manipulating a viewpoint in a three-dimensional map. The user interfaces in FIGS. 5A-5J are used to illustrate the processes in FIGS. 6A-6B.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video player module and a music player module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, orientation sensor(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to inputs on touch screen 112 (where the touch sensitive surface and the display are combined), a touch-sensitive surface that is separate from the display may be used instead of touch screen 112.

FIGS. 3A and 3B illustrate various embodiments for mapping the device orientation to a position of a camera or viewer (i.e., a viewpoint) and a direction of the camera/viewer so that the camera/viewer views a map object (e.g., building 304) on a three-dimensional map.

FIG. 3A illustrates map object 304 (e.g., a building) on surface 306 and changes to a viewpoint in a three-dimensional map based on a one-dimensional rotation of device 100 in accordance with some embodiments, where an orientation of device 100 relative to a predefined axis or direction (e.g., the direction of gravity) is used to determine the direction and position of a camera/viewer.

FIG. 3A shows device 100 in various orientations. As used herein, an angle of a device refers to an angle between an axis associated with the device and a reference axis. For example, the axis associated with device 100 may be an axis normal to the display screen (or any other surface of device 100), as illustrated in FIG. 3A. The reference axis may be a predefined axis, such as a vertical axis 310 in FIG. 3A. In FIG. 3A, device 100 in its initial orientation 300-1 has an angle $\theta_1$, which is zero degrees when the display screen of device 100 is oriented perpendicularly to vertical axis 310 (i.e., the surface normal is parallel to vertical axis 310 in FIG. 3A).

Also shown in FIG. 3A is a camera/viewer at initial location 302-1. In some embodiments, device 100 in orientation 300-1 displays a map view seen from the camera/viewer at location 302-1.

In some embodiments, the direction of the camera/viewer at location 302-1 has an angle that corresponds to the angle $\theta_1$ of device 100-1. As used herein, the angle of the direction of the camera/viewer (also called the angle of the camera/viewer) is defined as an angle formed by a reference axis and a line extending from the viewpoint in the viewing direction of the camera/viewer located at the viewpoint. In some embodiments, the reference axis used in determining the angle of the device and the reference axis used in determining the angle of the camera/viewer are identical. For example, in FIG. 3A, the camera/viewer at location 302-1, corresponding to orientation 300-1, also has the angle $\theta_1$, which is zero degrees (i.e., the direction of the camera/viewer is parallel to the reference axis). As a result, the camera/viewer at location 302-1 looks down on map object 304 from the top, directly above map object 304.

FIG. 3A also illustrates a rotation of device 100 from initial orientation 300-1 to second orientation 300-2. In second orientation 300-2, device 100 has an angle $\theta_2$. In some embodiments, in accordance with the rotation of device 100 from orientation 300-1 to orientation 300-2, the camera/viewer moves from location 302-1 to location 302-2, and device 100 in orientation 300-2 displays a map view seen from the camera/viewer at location 302-2. Location 302-2 has a distance to map object 304 that corresponds to the distance between location 302-1 and map object 304. For example, the distance between a respective viewpoint (a respective location of the camera/viewer) and map object 304 may remain the same during the rotation of device 100.

In some embodiments, a viewpoint (i.e., a location of the camera/viewer) is characterized by an angle formed by a reference axis and a line extending from the location of the camera/viewer to a reference point on the three-dimensional map. The reference point may be a location on the three-dimensional map or a location of a preselected feature or map object (e.g., map object 304). In some embodiments, the reference axis used in determining the angle of device 100 and the reference axis used in determining the angle of the location are identical. For example, in FIG. 3A, the location 302-2, corresponding to orientation 300-2, has the angle $\theta_2$.

In some embodiments, an angle of the camera/viewer at a viewpoint corresponds to the angle of the viewpoint. For example, at location 302-2 that has the angle $\theta_2$, the camera/viewer also has the angle $\theta_2$. As a result, the camera/viewer at location 302-2 is also directed to map object 304, as shown in FIG. 3A.

In addition, FIG. 3A further illustrates a rotation of device 100 from second orientation 300-2 to third orientation 300-3. In third orientation 300-3, device 100 has an angle $\theta_3$. In some embodiments, in accordance with the rotation of device 100 from orientation 300-2 to orientation 300-3, the camera/viewer moves to location 302-3, which has the angle $\theta_3$, and device 100 in orientation 300-3 displays a map view of map object 3004 seen from the camera/viewer at location 302-3.

In some embodiments, when device 100 rotates back from orientation 300-3 to orientation 300-2, the camera/viewer moves from location 302-3 to location 302-2, and device 100 in orientation 300-2 displays a map view of map object 304 seen from the camera/viewer at location 302-2. Similarly, in some embodiments, when device 100 rotates from orientation 300-2 to orientation 300-1, the camera/viewer moves from location 302-2 to location 302-1, and device 100 in orientation 300-1 displays a map view of map object 304 seen from the camera/viewer at location 302-1.

As described above, FIG. 3A illustrates that, in some embodiments, despite the movement of the camera/viewer from one viewpoint to another viewpoint, the distance between the camera/viewer and map object 304 remains fixed. It should be also noted that, despite the movement of the camera/viewer from one viewpoint to another viewpoint, the camera/viewer remains oriented toward map object 304 (i.e., the camera/viewer faces three-dimensional map object 304 during the rotation of device 100).

Although FIG. 3A illustrates discrete locations 302-1, 302-2, and 302-3, it should be noted that, in some embodiments, the viewpoint moves continuously or semi-continuously. In other words, while device 100 rotates from orientation 300-1 to orientation 300-2, views of map object 304 from a plurality of locations other than locations 302-1 and 302-2, as well as views of map object 304 from locations 302-1 and 302-2, may be displayed one-by-one.

FIG. 3B also illustrates map object 304 on surface 306. However, FIG. 3B illustrates changes to a viewpoint in a three-dimensional map based on a one-dimensional rotation of a device in accordance with some other embodiments, where a relative orientation (i.e., change in the direction of device 100 relative to the initial direction of device 100) of device 100 is used to determine the direction and position of the camera/viewer.

In FIG. 3B, device 100 is initially in orientation 300-4, where device 100 has an angle $\theta_4$ with respect to a reference axis, such as vertical axis 320 in FIG. 3B. In some embodiments, device 100 in orientation 300-4 displays a map view of map object 304 seen from the camera/viewer at location 302-4. In some embodiments, location 302-4 has zero angle with respect to the same reference axis.

As described below, in some embodiments, the initial orientation 300-4 of device 100 (e.g., the initial angle $\theta_4$ of device 100) is used in determining the angle of the camera/viewer.

Also illustrated in FIG. 3B is a rotation of device 100 from initial orientation 300-4 to subsequent orientation 300-5. In orientation 300-5, device 100 has an angle $\theta_4+\theta_5$. In some embodiments, in accordance with the rotation of device 100 from orientation 300-4 to orientation 300-5, the camera/viewer moves from location 302-4 to location 302-5, and device 100 in orientation 300-5 displays a view from location 302-5. In some embodiments, the angle difference between the initial orientation of the device to the subsequent orientation of the device matches the angle difference between the initial location of the camera/viewer (e.g., viewpoint 302-4) and the subsequent location of the camera/viewer (e.g., viewpoint 302-5). For example, the angle difference between orientation 300-4 and orientation 300-5 is $\theta_5$, and the angle difference between locations 302-4 and 302-5 is also $\theta_5$. In addition, the angle of the camera/viewer at the subsequent location (e.g., location 302-5) corresponds to the difference between the angle of the device in the subsequent orientation of the device (e.g., orientation 300-5) and the angle of the device in the initial orientation (e.g., orientation 300-4). As a result, the camera/viewer at location 302-5 faces map object 304, as shown in FIG. 3B.

FIG. 3B further illustrates a rotation of device 100 from orientation 300-5 to orientation 300-6. In orientation 300-6, device 100 has an angle $\theta_4+\theta_6$. In some embodiments, in accordance with the rotation of device 100 from orientation 300-5 to orientation 300-6, the camera/viewer moves from location 302-5 to location 302-6, and device 100 in orientation 300-6 displays a view from location 302-6. It should be noted that the angle difference between orientation 300-4 and orientation 300-6 is $\theta_6$, and the angle difference between locations 302-4 and 302-6 is also $\theta_6$. The angle of the camera/viewer at location 302-6 corresponds to the difference between the angle of device 100 in orientation 300-6 and the angle of device 100 in orientation 300-4. As a result, the camera/viewer at location 302-6 faces map object 304, as shown in FIG. 3B.

Although the rotation of device 100 from orientation 300-5 to orientation 300-6 is described above with respect to the angle changes relative to the initial angle $\theta_4$, it can also be described with respect to the angle changes relative to the angle of the device in orientation 300-5 (e.g., $\theta_4+\theta_5$). Similarly, the movement of the camera/viewer from viewpoint 302-5 to viewpoint 302-6 can be described with respect to the angle changes relative to the angle of the camera/viewer at viewpoint 302-5 (e.g., $\theta_5$). A person having ordinary skill in the art would understand that many different coordinates and/or different reference axes may be used to describe a rotation of a device or a movement of a camera/viewer. Such alternative descriptions illustrating the same rotation of the device or the same movement of the camera/viewer are omitted for brevity.

FIG. 3B illustrates that the angle difference between orientation 300-4 and orientation 300-5 (e.g., $\theta_5$) matches the angle difference between locations 302-4 and 302-5 (e.g., $\theta_5$). In some embodiments, the angle difference between an initial location of the viewpoint and a subsequent location of the viewpoint is proportional to the angle difference between an initial orientation and a subsequent orientation of device 100, but is not identical to the angle difference between an initial orientation and a subsequent orientation of device 100. For example, in some embodiments, the angle difference between an initial location of the viewpoint and a subsequent location of the viewpoint is a fraction of the angle difference between an initial orientation and a subsequent orientation of device 100 (e.g., when device 100 rotates 60 degrees, the viewpoint moves by 30 degrees, which is half of the angle difference in the rotation of device 100).

FIGS. 3A-3B illustrate changes to a viewpoint in a three-dimensional map based on a one-dimensional rotation of device 100. However, the rotation of device 100 need not be limited to a one-dimensional rotation.

FIG. 4 illustrates changes to a viewpoint in a three-dimensional map based on a two-dimensional rotation of a device in accordance with some embodiments. Shown in FIG. 4 are two arrows 402 and 404 illustrating a rotation of device 100 with components of the rotation around two respective axes. Arrow 402 illustrates a rotation of device 100 around x axis 420, which points out of the page in FIG. 4. Arrow 404 illustrates a rotation of device around y axis 422. In FIG. 4, y axis 422 is perpendicular to x axis 420.

FIG. 4 also illustrates that, in response to the rotation of device 100 around x axis 420 (e.g., in the direction of arrow 402 in the y-z plane), viewpoint 406 moves along arrow 408, similar to the rotation of device 100 and the movement of the viewpoint illustrated in FIGS. 3A-3B. FIG. 4 further illustrates that, in response to the rotation of device 100 around y axis 422 (e.g., in the direction of arrow 404 in the x-z plane), viewpoint 406 moves along arrow 410, which is perpendicular to arrow 408. When device 100 rotates with components of rotation around both x axis 420 and y axis 422, viewpoint 406 moves with components of movement in the direction of both arrows 408 and 410.

Although not shown in FIG. 4, device 100 may also rotate around z axis 424 in the x-y plane. In some embodiments, in response to a rotation of device 100 around z axis 424, device 100 rotates its display either from a portrait orientation to a landscape orientation or from the landscape orientation to the portrait orientation.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. A "z axis" is distinct from the "x axis" and the "y axis," and typically perpendicular to both the "x axis" and the "y axis."

User Interfaces and Associated Processes

Attention is now directed towards embodiments of user interfaces ("UI") and associated processes that may be implemented on an electronic device with a display and orientation sensors, such as portable multifunction device 100.

FIGS. 5A-5J illustrate exemplary user interfaces for manipulating a viewpoint in a three-dimensional map based on a device orientation in accordance with some embodiments. The user interfaces in these figures are used to illustrate the processes described below, including the processes in FIGS. 6A-6B.

Figure 5B:
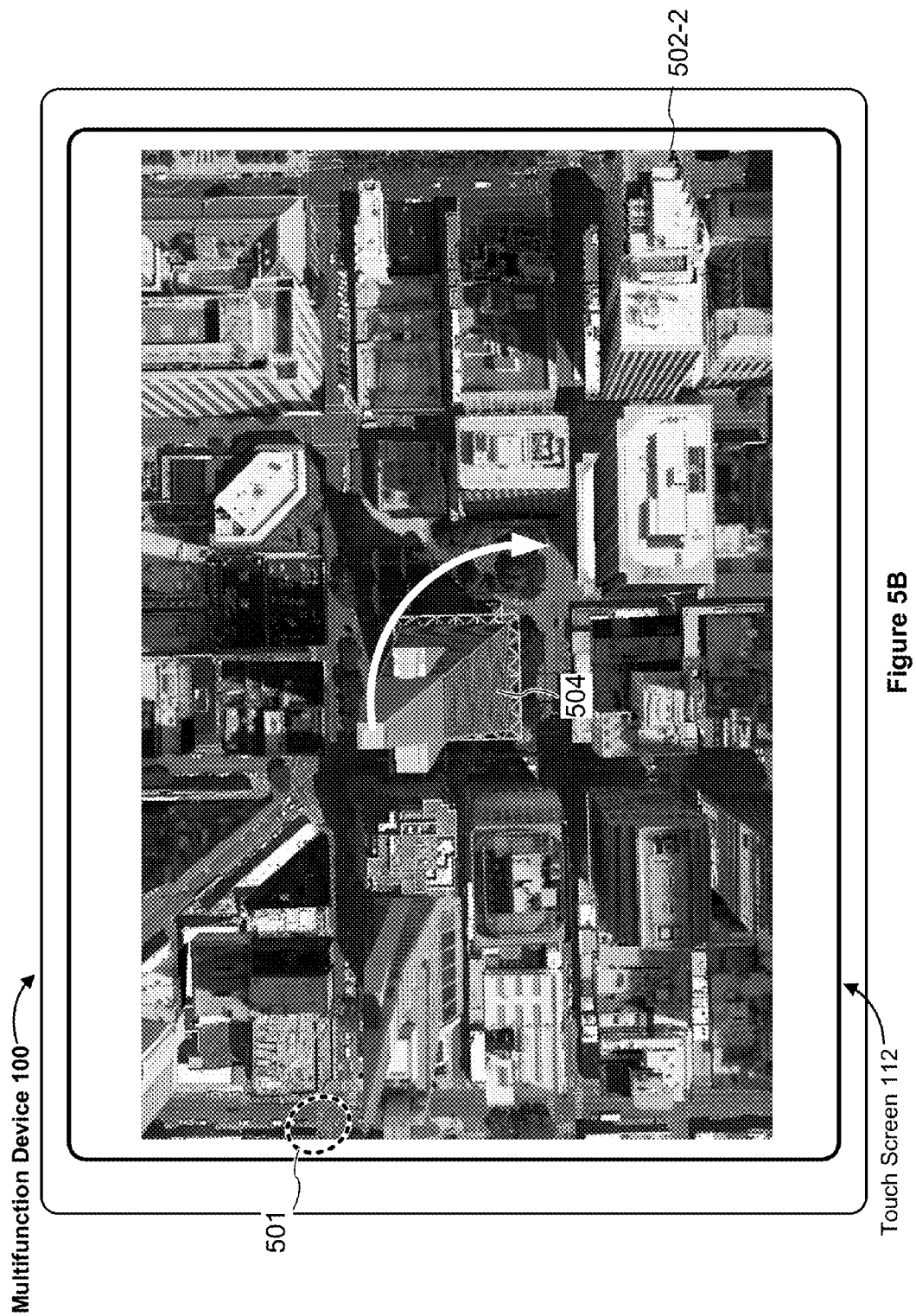
Figure 5C:
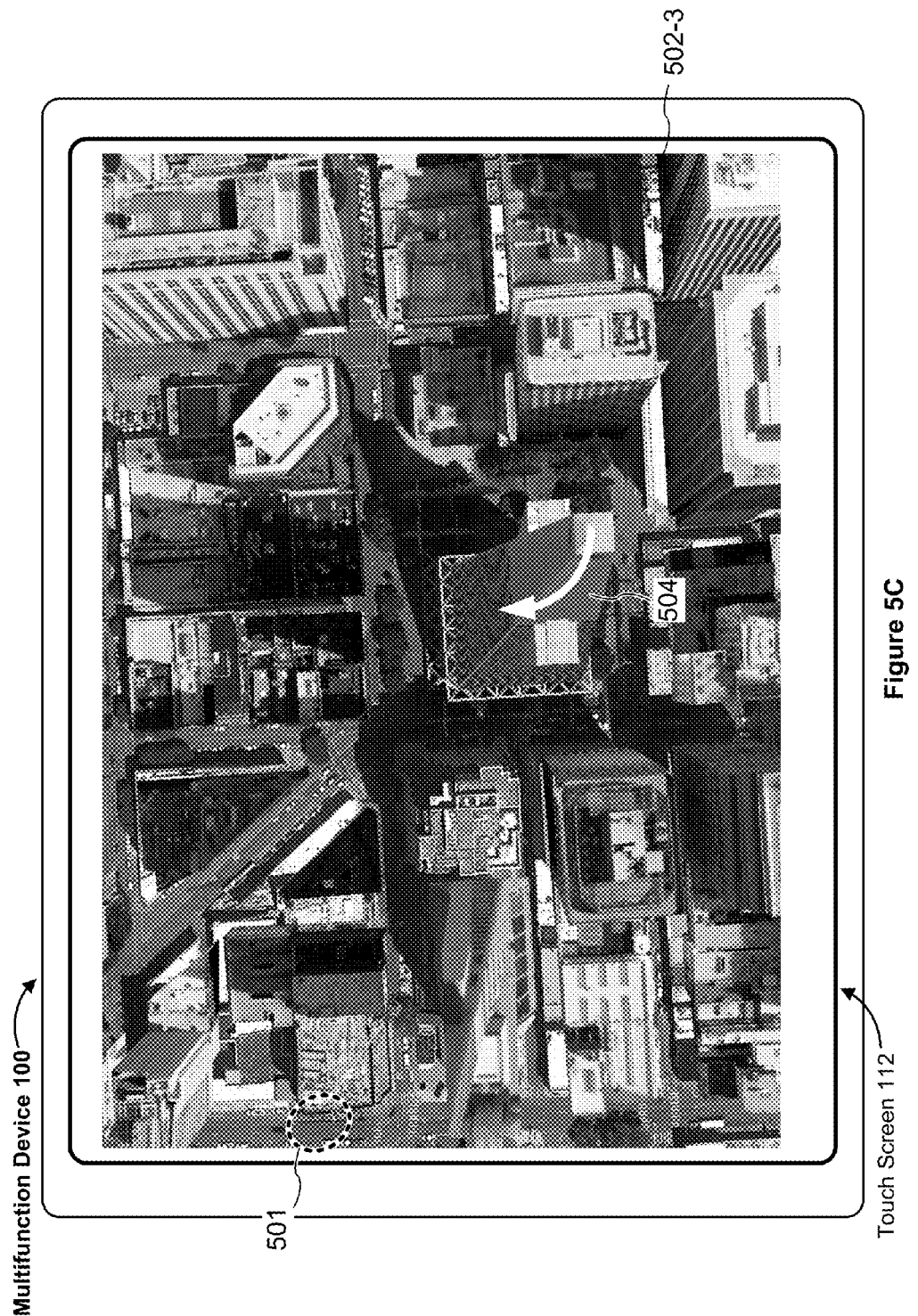

FIG. 5A illustrates top-down view 502-1 of a three-dimensional map in accordance with some embodiments. The three-dimensional map includes building 504 in the center of the three-dimensional map. FIG. 5A also illustrates detection of finger gesture 501 on touch screen 112 (e.g., a press-and-hold gesture). In some embodiments, device 100 enters a map rotation mode in response to detecting a finger gesture (e.g., finger gesture 501) on touch screen 112. In some embodiments, the view of the three-dimensional map changes to indicate that device 100 has entered the map rotation mode (e.g., the buildings in the three-dimensional map initially move in a predefined pattern). For example, the viewpoint moves along a predefined path, such as an arc or spiral, in the three-dimensional map, to indicate device 100 has entered the map rotation mode. As a result, as shown in FIGS. 5A-5D, the buildings in the three-dimensional map appear to move along an arc or spiral on touch screen 112 (e.g., map view 502-2 shows that the top of the buildings has moved toward the upper left corner of device 100, map view 502-3 shows that the top of the buildings has subsequently moved toward the lower right corner of device 100, and map view 502-4 shows that the top of the buildings has returned to original location). Alternatively, one or more visual indicators (e.g., one or more symbols, lines, and/or text) may be used to indicate that device 100 has entered, or is in, the map rotation mode.

Figure 5D:
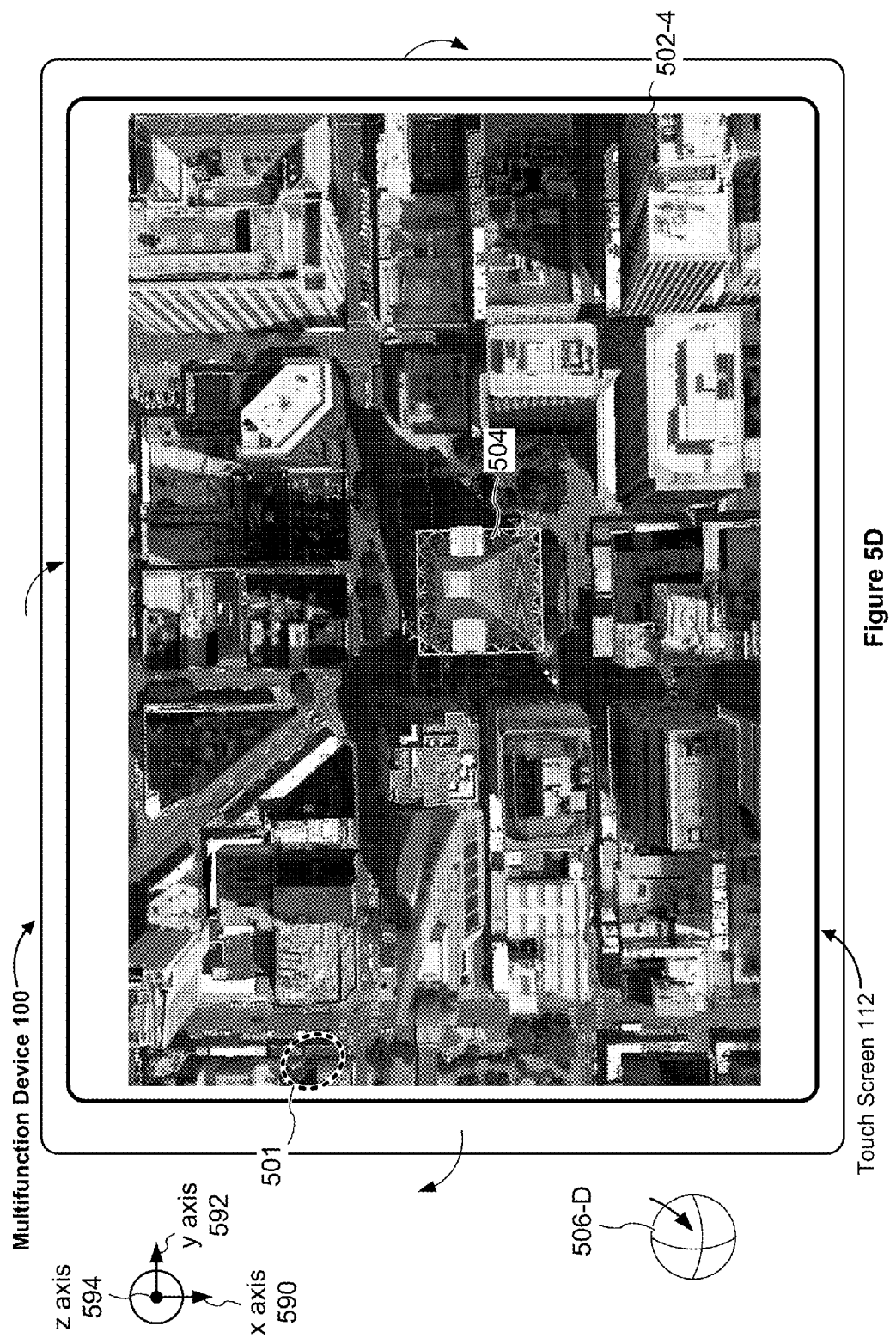

FIG. 5D illustrates top-down view 502-4 of the three-dimensional map. FIG. 5D also illustrates that device 100 rotates with components of rotation around two axes 590 and 592. Graphical symbol 506-D illustrates the rotation of device 100 from FIG. 5D to FIG. 5E, which will result in view 502-4 being updated to view 502-5.

Figure 5E:
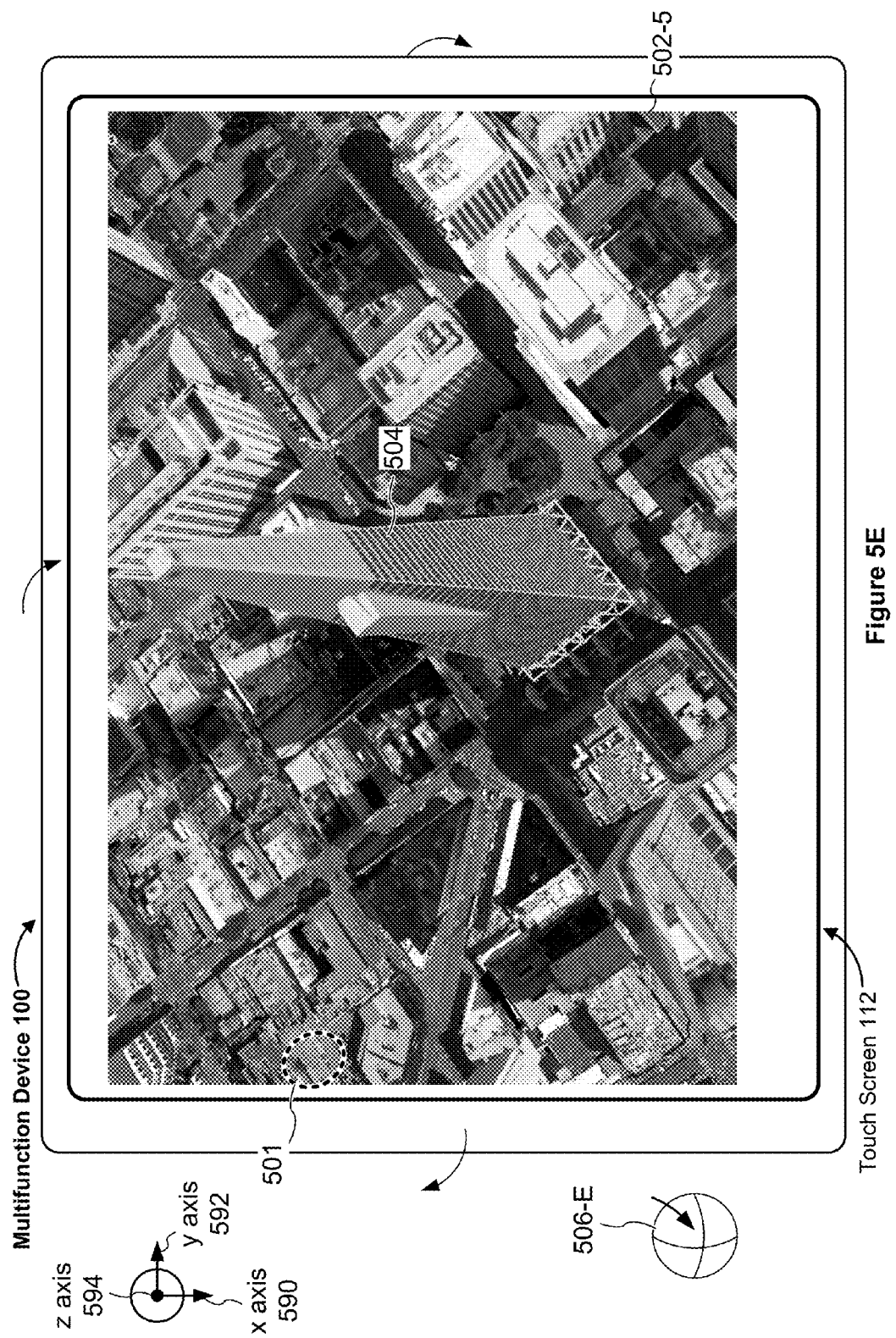

In FIG. 5E, device 100 displays map view 502-5 in accordance with the rotation of device 100 illustrated in FIG. 5D. Comparing map views 502-4 and 502-5, the elevation (or altitude) of the viewpoint has decreased. In addition, the viewpoint has also moved on the three-dimensional map so that two sides of building 504 are no longer shown in map view 502-5. However, the distance from the viewpoint and building 504 has not changed. In addition, building 504 remains in the center of map view 502-5. FIG. 5E also illustrates that device 100 further rotates along two axes 590 and 592. Graphical symbol 506-E illustrates the further rotation of device 100 from FIG. 5E to FIG. 5F, which will result in the view being updated to view 502-6.

Figure 5F:
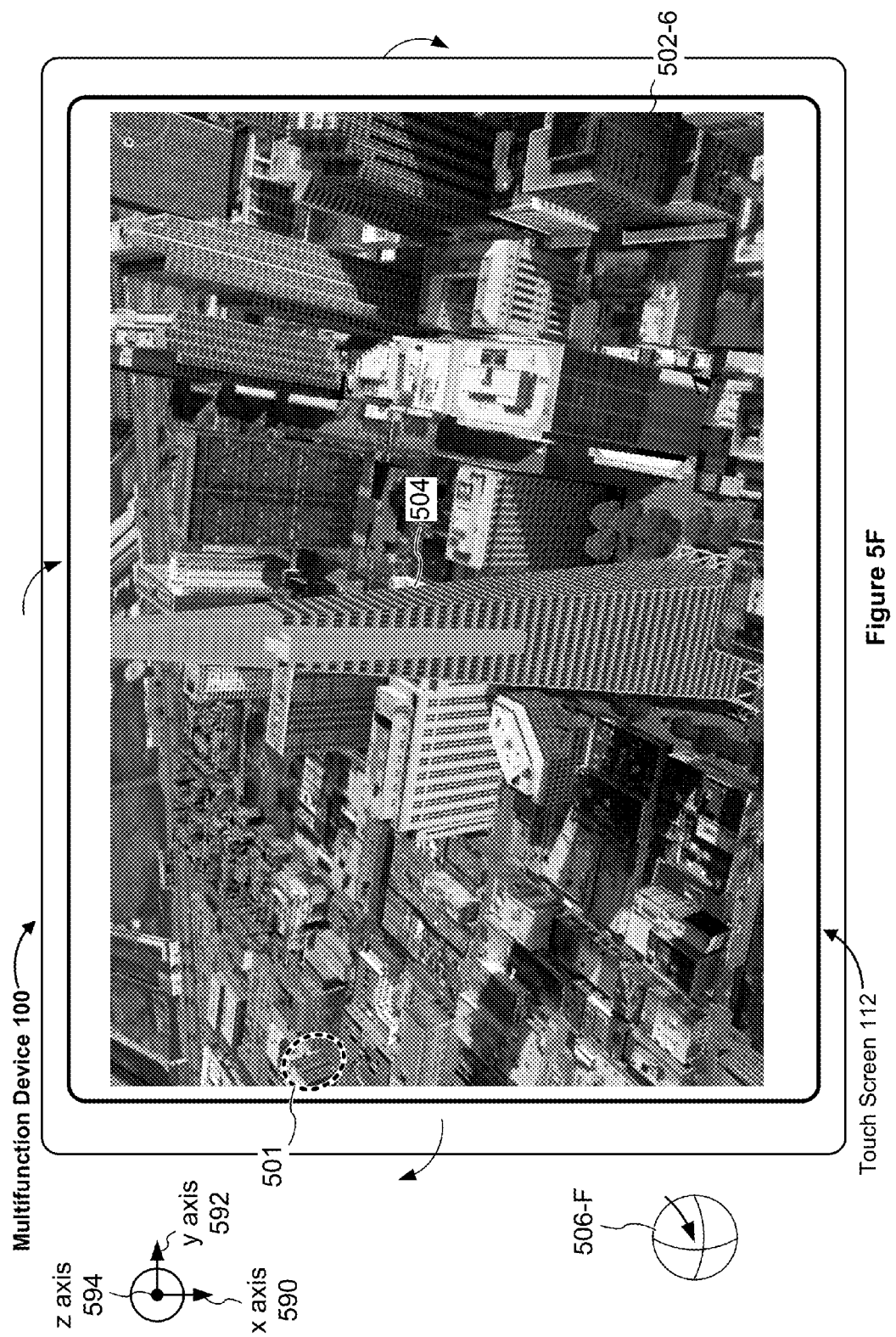

FIG. 5F illustrates that map view 502-6 displayed by device 100 in accordance with the rotation of device 100 illustrated in FIG. 5E. Comparing map views 502-5 and 502-6, the viewpoint has moved further on the three-dimensional map. As described above with respect to FIG. 5E, the distance from the viewpoint and building 504 has not changed, and building 504 remains in the center of map view 502-6. FIG. 5F also illustrates that device 100 rotates with components of rotation around axes 590 and 592. Graphical symbol 506-F illustrates the further rotation of device 100 from FIG. 5F to FIG. 5G, which will result in the view being updated to view 502-7.

Figure 5G:
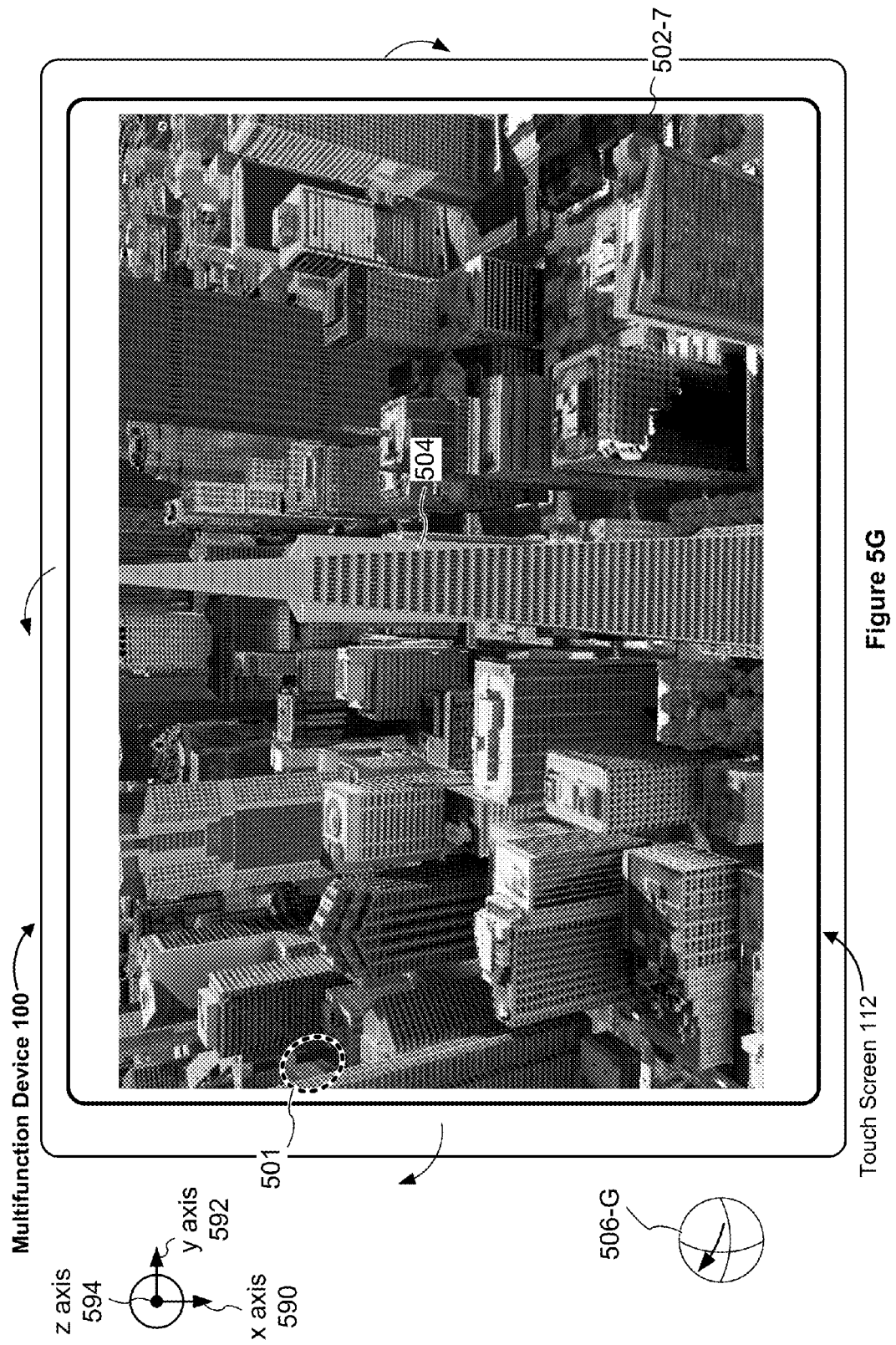

FIG. 5G illustrates that device 100 displays map view 502-7 in accordance with the rotation of device 100 illustrated in FIG. 5F. Comparing map views 502-6 and 502-7, the viewpoint has moved so that only one side of building 504 is shown in map view 502-7. For this viewpoint, the three other sides are not visible in map view 502-7. In FIG. 5G, the distance from the viewpoint and building 504 has not changed, and building 504 remains in the center of map view 502-7. FIG. 5G also illustrates that device 100 rotates with components of rotation around axes 590 and 592. Graphical symbol 506-G illustrates the further rotation of device 100 from FIG. 5G to FIG. 5H, which will result in the view being updated to view 502-8.

Figure 5H:
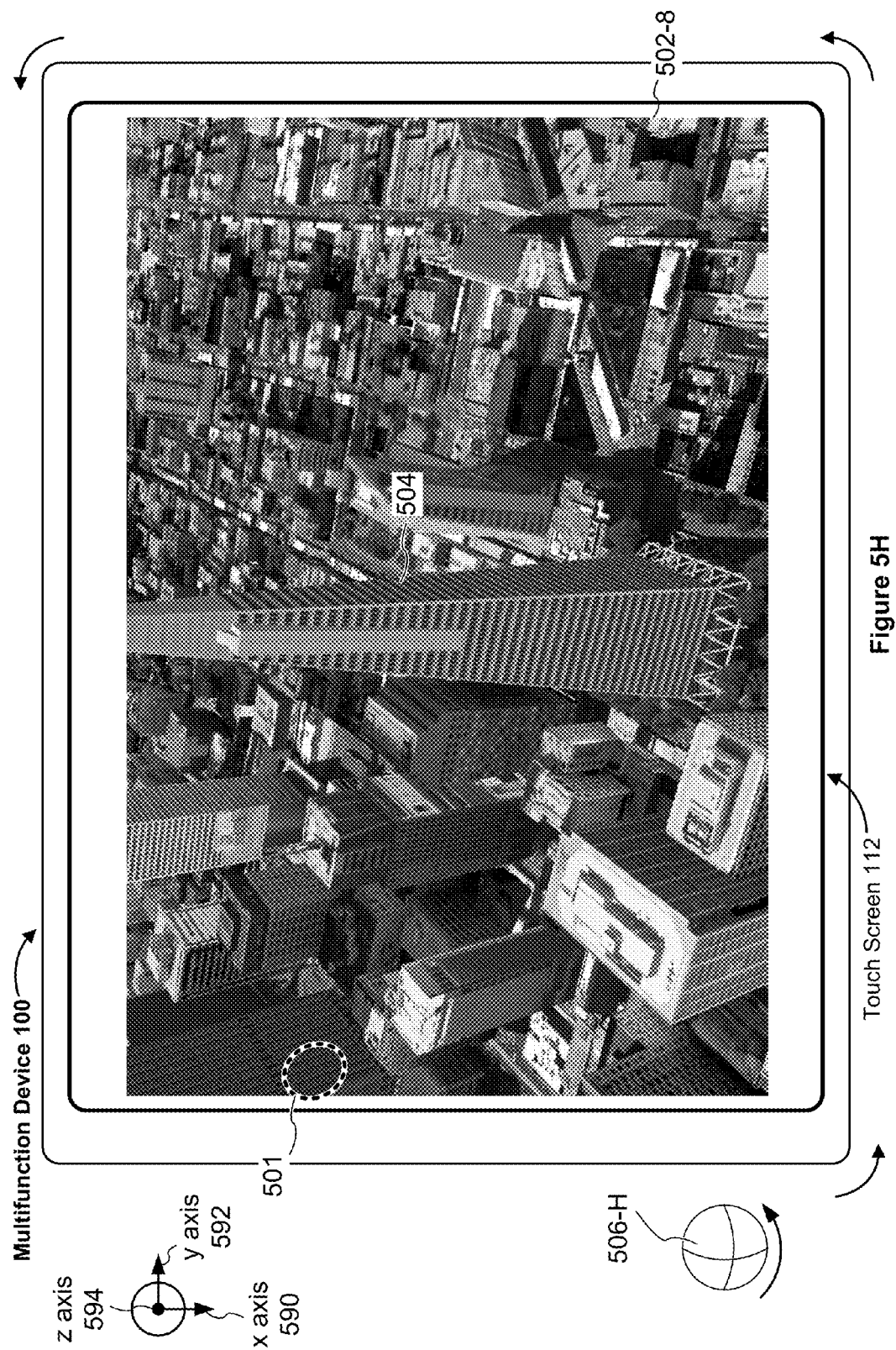
Figure 6A:
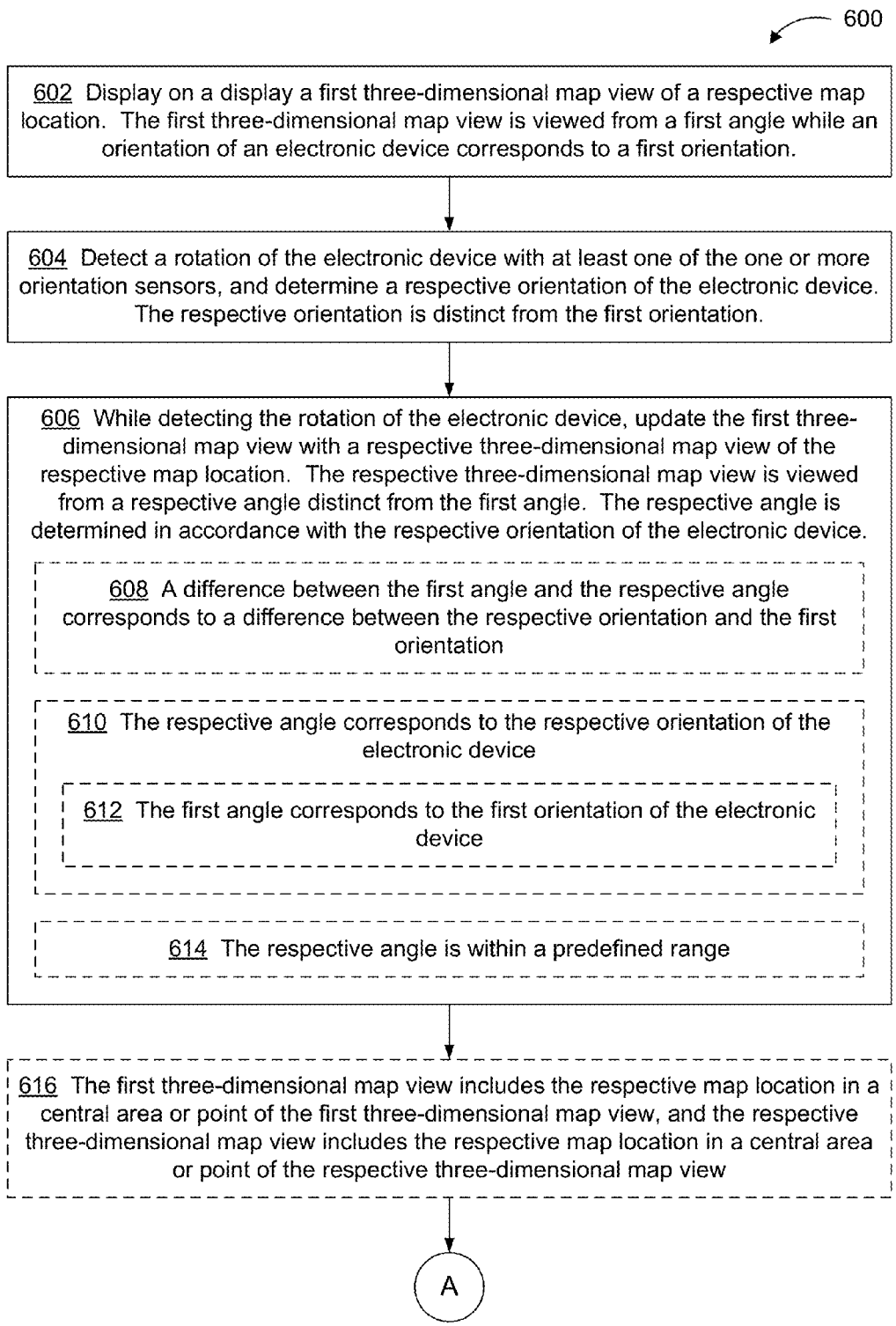

In FIG. 5H, device 100 displays map view 502-8 in accordance with the rotation of device 100 illustrated in FIG. 5G. Comparing map views 502-7 and 502-8, the elevation (or altitude) of the viewpoint has increased. In addition, the viewpoint has moved so that two sides of building 504 are shown in map view 502-8. As described above, the distance between the viewpoint and building 504 has not changed, and building 504 remains in the center of map view 502-8. FIG. 5H also illustrates that device 100 rolls (i.e., device 100 rotates around z axis 594, an axis extending out of the page). Graphical symbol 506-H illustrates the rotation of device 100 around z axis 594.

Figure 5I:
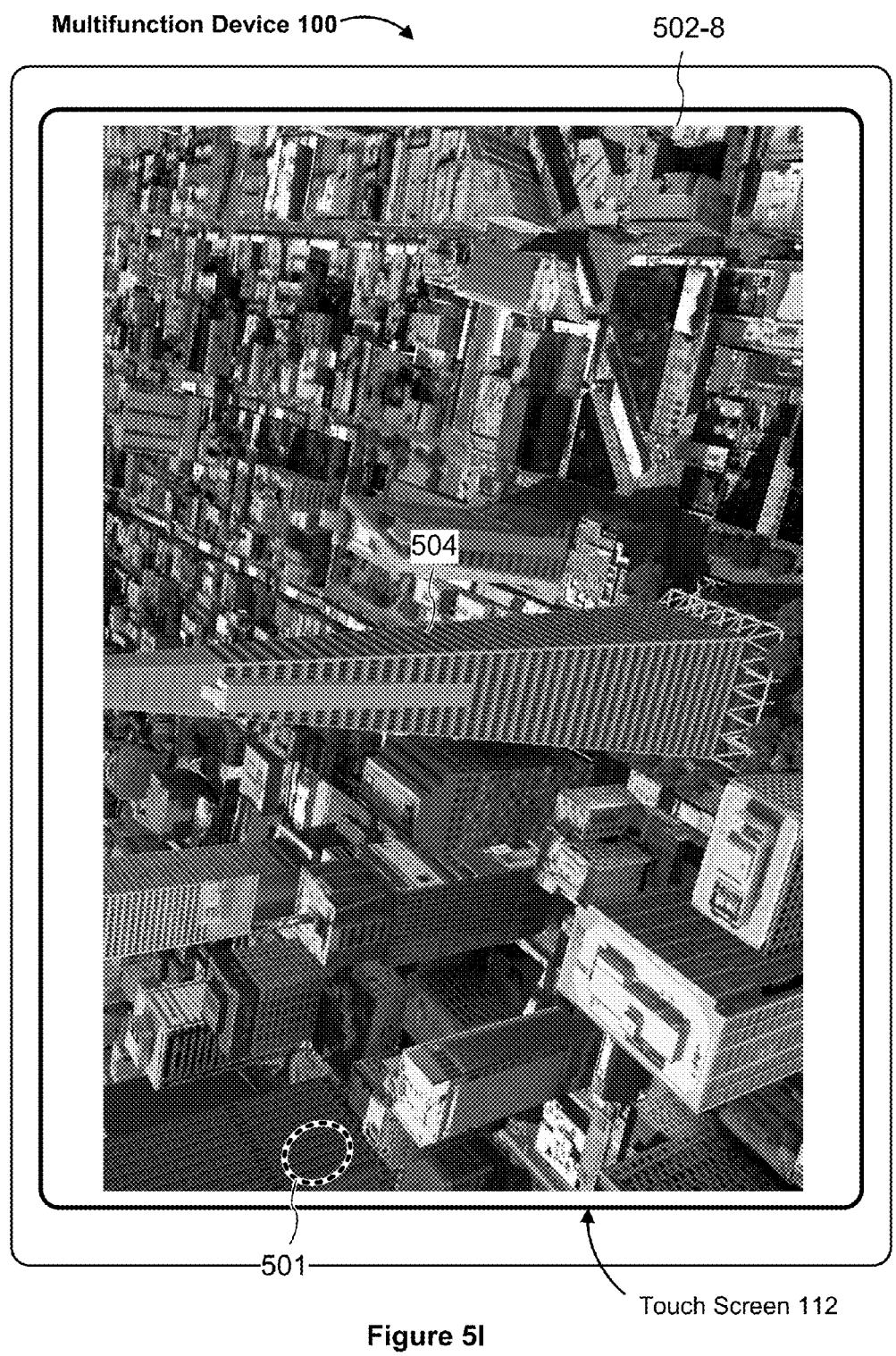

It should be noted that, in FIGS. 5A-5I, a finger contact in finger gesture 501 remains on touch screen 112, and, in some embodiments, device 100 remains in the map rotation mode while the finger contact in finger gesture 501 remains on touch screen 112. FIG. 5I illustrates that, in some embodiments, map view 502-8 remains on touch screen 112 despite the rotation of device 100 around z axis 594 (FIG. 5H).

Figure 5J:
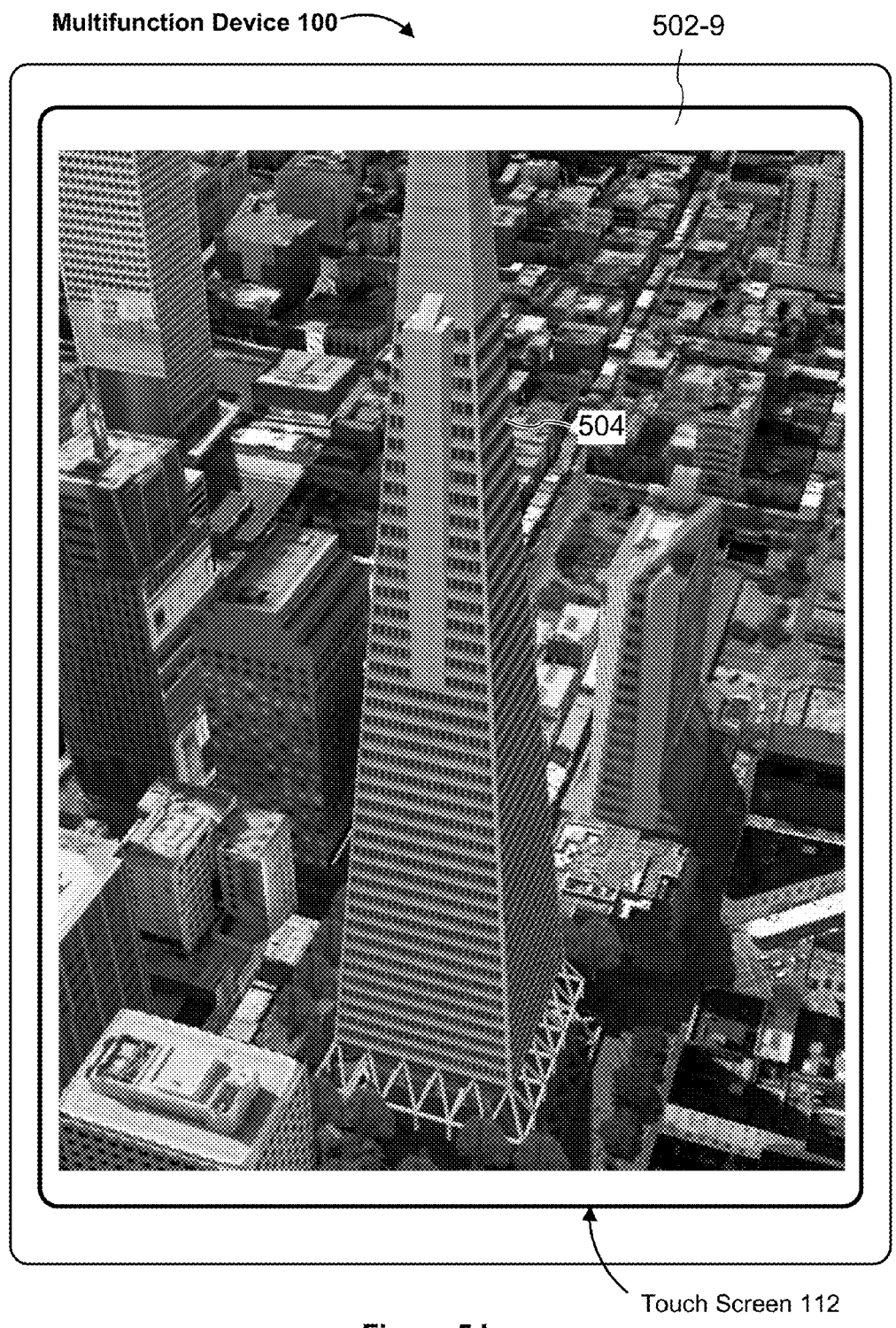

In FIG. 5J, finger gesture 501 (shown in FIGS. 5A-5I) is no longer detected on touch screen 112 (e.g., the finger touch in finger gesture 501 has lifted off of touch screen 112). FIG. 5J also illustrates that, in response to determining that finger gesture 501 ceases to be detected on touch screen 112, device 100 displays map view 502-9. Both map views 502-8 and 502-9 are views of building 504 from the same viewpoint. However, map view 502-8 is a landscape view of building 504 and map view 502-9 is a portrait view of building 504. In some embodiments, in response to determining that finger gesture 501 ceases to be detected on touch screen 112, device 100 exits from the map rotation mode. Although FIGS. 5I-5J illustrate that, in some embodiments, device 100 maintains either portrait or landscape orientation of the displayed map view while in the map rotation mode, in other embodiments, device 100 changes the orientation of the displayed map view, without delay, in response to detecting the rotation of device 100 around z axis 594 (FIG. 5H).

Although FIGS. 5A-5I illustrate that, in some embodiments, device 100 remains in the map rotation mode while a finger contact (e.g., in finger gesture 501, FIG. 5A) is detected on touch screen 112, in some other embodiments, device 100 remains in the map rotation mode while displaying a three-dimensional map regardless of a contact being continuously detected on touch screen 112. In some embodiments, device 100 enters the map rotation mode in response to detecting a first predefined gesture (e.g., a single-tap gesture, a double-tap gesture, a triple-tap gesture, etc.) on touch screen 112. In some embodiments, device 100 enters the map rotation mode in response to detecting activation of a physical button (e.g., a single click, double click, or triple click on one of buttons 204, 206, or 208). In some embodiments, device 100 exits from the map rotation mode in response to detecting a second predefined gesture (e.g., a single-tap gesture, a double-tap gesture, a triple-tap gesture, etc.) on touch screen 112. In some embodiments, device 100 exits the map rotation mode in response to detecting activation of a physical button (e.g., a single click, double click, or triple click on one of buttons 204, 206, or 208).

FIGS. 6A-6B are flow diagrams illustrating method 600 of manipulating a viewpoint in a three-dimensional map in accordance with some embodiments. Method 600 is performed at an electronic device (e.g., portable device 100, FIG. 1) with a display and one or more orientation sensors. In some embodiments, the electronic device includes a touch-sensitive surface separate from the display. In some embodiments, the display is a touch screen display that includes a touch-sensitive surface on the display. Some operations in method 600 may be combined and/or the order of some operations may be changed.

As described below, method 600 provides an intuitive way to select a viewpoint in a three-dimensional map. The method reduces the cognitive burden on a user when manipulating a viewpoint in a three-dimensional map, thereby creating a more efficient human-machine interface. For battery-operated electronic devices, enabling a user to select a viewpoint in a three-dimensional map faster and more efficiently conserves power and increases the time between battery charges.

The electronic device displays (602) on the display a first three-dimensional map view of a respective map location (e.g., map view 502-4 in FIG. 5D). The first three-dimensional map view is viewed from a first angle (e.g., $\theta_1$ in FIG. 3A) while an orientation of the electronic device corresponds to a first orientation. For example, the displayed map view 502-4 may correspond to a view of map object 304 viewed from viewpoint 302-1 shown in FIG. 3A when the device has orientation 300-1. It should be understood that the respective map location need not be located on a ground surface of the three-dimensional map. In other words, the respective map location may be located on or above the ground surface of the three-dimensional map. For example, the respective map location may be the tenth floor of a particular building or even a location in an empty space (e.g., thirty feet above the top of a building) in the three-dimensional map.

The electronic device detects (604) a rotation of the electronic device with at least one of the one or more orientation sensors, and determines a respective orientation of the electronic device. The respective orientation is distinct from the first orientation. For example, device 100 rotates from orientation 300-1 to orientation 300-2 shown in FIG. 3A, and device 100 detects a rotation of device 100 using at least one of the one or more orientation sensors (e.g., orientation sensors 168). In some embodiments where the one or more orientation sensors provide information concerning the orientation of the electronic device, the electronic device determines the rotation of the electronic device in accordance with changes in the orientation of the electronic device. Alternatively, in some embodiments where the one or more orientation sensors provide information concerning the rotation of the electronic device (e.g., a rotational speed or rotational acceleration), the electronic device determines the rotation of the electronic device in accordance with the information concerning the rotation of the electronic device (e.g., the electronic device is determined to be in rotation when the rotational speed is not zero). In such embodiments, the orientation of the electronic device may be determined by calculating the integral of the rotational speed of the electronic device.

While detecting the rotation of the electronic device, the electronic device updates (606) the first three-dimensional map view with a respective three-dimensional map view of the respective map location (e.g., map view 502-5 in FIG. 5E). The respective three-dimensional map view is viewed from a respective angle (e.g., $\theta_2$ in FIG. 3A) distinct from the first angle (e.g., $\theta_1$ in FIG. 3A). The respective angle is determined in accordance with the respective orientation of the electronic device. For example, the angle $\theta_2$ of location 302-2 corresponds to orientation 302-2 of device 100 in FIG. 3A. Thus, the user can select both the viewpoint (i.e., the location of the camera/viewer) and the angle of the camera/viewer based on the rotation of the electronic device, thereby eliminating the need for multiple keyboard or mouse inputs.

In some embodiments, the respective angle is parallel to the orientation of the electronic device. In one example described based on a Cartesian coordinate system, where a z-axis is in the opposite direction of gravity, an x-axis is perpendicular to the z-axis and a y-axis is perpendicular to the x-axis and z-axis, the orientation of the electronic device facing away from the direction of gravity can be represented by a Euclidean vector V (0, 0, 1). The first value 0 of V is a cosine value of the angle formed by the orientation of the electronic device and the x-axis (90°), the second value 0 of V is a cosine value of the angle formed by the orientation of the electronic device and the y-axis (90°), and the third value 1 of V is a cosine value of the angle formed by the orientation of the electronic device and the z-axis (0°). Then, the respective angle is represented by a vector −V (0, 0, −1), indicating that the respective angle is perpendicular to the x-axis and y-axis and that the respective angle is parallel to the z-axis but is in a direction opposite to the z-axis. In other words, when a display of the electronic device is facing straight up, the respective angle is in the direction of looking straight down on the respective map location.

In some embodiments, the respective angle is determined based on the previous angle (of the camera/viewer) and the rotation of the electronic device. When the rotation of the electronic device is represented by a rotation matrix, the respective angle is determined by multiplying the rotation matrix with a directional vector corresponding to the previous angle. Alternatively, quaternions or Euler angles can be used to calculate the respective angle based on the previous angle and the rotation of the electronic device.

In some embodiments, updating the first three-dimensional map view with the respective three-dimensional map view of the respective map location includes rendering the respective three-dimensional map view of the respective map location viewed from the respective angle. In one example, the respective map location in the three-dimensional map is represented by Cartesian coordinates $(x_0, y_0, z_0)$, the distance between the respective map location and a respective viewpoint is represented by L, and the respective viewing angle is represented by $(\alpha, \beta, \chi)$, where $\alpha$ corresponds to an angle between the viewing direction of the camera/viewer and an x axis, $\beta$ corresponds to an angle between the viewing direction of the camera/viewer and a y axis, and $\chi$ corresponds to an angle between the viewing direction of the camera/viewer and a z axis. Then, a respective viewpoint (i.e., the location of the camera/viewer) that views the respective map location from the respective viewing angle $(\alpha, \beta, \chi)$ is represented as $(x_0-L\cdot\cos(\alpha), y_0-L\cdot\cos(\beta), z_0-L\cdot\cos(\chi))$. It should be noted that the representation of the respective viewing angle with three angle parameters, α, β, and χ, is used for illustration purposes. As a person having ordinary skill in the art would understand, the three angle parameters, α, β, and χ, are interrelated, as governed by the following equation: $\cos^2(\alpha)+\cos^2(\beta)+\cos^2(\chi)=1$. Thus, it is possible to represent the respective angle with fewer than three angle parameters (e.g., α and β only, β and χ only, α and χ only, etc.).

In some embodiments, a difference between the first angle and the respective angle corresponds (608) to a difference between the respective orientation and the first orientation. In other words, in some embodiments, the respective angle is determined in accordance with the difference between the respective orientation and the first orientation of the electronic device, rather than based on the respective orientation of the electronic device alone. For example, in some embodiments, the difference between the first angle (for viewpoint 302-4) and the respective angle (for viewpoint 302-5) is $\theta_5$, which corresponds to the angle difference between the respective orientation (e.g., orientation 300-5) and the first orientation (e.g., orientation 302-4).

In some embodiments, the respective angle corresponds (610) to the respective orientation of the electronic device. In other words, in some embodiments, the respective angle is determined in accordance with the respective orientation of the electronic device alone, without using the first orientation of the electronic device. For example, in FIG. 3A, when orientation 302-2 of device 100 has the angle $\theta_2$, the respective angle of the camera/viewer is the same angle, $\theta_2$.

In some embodiments, the first angle corresponds (612) to the first orientation of the electronic device. For example, in FIG. 3A, when orientation 302-1 of device 100 has the angle $\theta_1$, the respective angle of the camera/viewer is the same angle, $\theta_1$.

In some embodiments, the respective angle is (614) within a predefined range (e.g., between −90 degrees and +90 degrees). In some embodiments, the predefined range does not include one or more angles from which the respective map location is viewed from underground (i.e., the respective angle does not allow the viewpoint to be located underground). In some embodiments, the predefined range does not include one or more angles from which a view of the respective map location is occluded by one or more other map objects.

In some embodiments, the first three-dimensional map view includes (616) the respective map location in a central area or point of the first three-dimensional map view, and the respective three-dimensional map view includes the respective map location in a central area or point of the respective three-dimensional map view. The central point, as used herein, refers to a center of a respective map view. In some embodiments, a respective map view is divided into an N-by-N equal-sized regions (where N is an integer larger than one), and the central area refers to a center region of the $N^2$ regions, when N is an odd number. When N is an even number, the central area refers to one or more of central four regions of the $N^2$ regions. For example, the respective map view may be divided into a three-by-three grid of equal-sized regions, and the central area refers to a center region of the nine regions. In some embodiments, the central area refers to a circular region centered in a respective map view with a diameter corresponding to at least 3%, 5%, 10%, 20%, 30%, 40%, or 50% of the length of the display screen. In some embodiments, the central area refers to an elliptical region centered in a respective map view with a major axis length corresponding to at least 3%, 5%, 10%, 20%, 30%, 40%, or 50% of the length of the display screen and a minor axis length corresponding to the same fraction of the width of the display screen. In some embodiments where the size of the respective map location (or a map object located at the respective map location) is larger than the central area, the respective map location is deemed to be located in the central area when a respective point of the respective map location is located in the central area. In some other embodiments where the size of the respective map location (or a map object located at the respective map location) is larger than the central area, the respective map location is deemed to be located in the central area when a center point of the respective map location is located in the central area.

In some embodiments, the electronic device includes (618) a touch-sensitive surface (e.g., touch screen 112, FIG. 5A). While displaying the first three-dimensional map view on the display, the electronic device detects a predefined gesture (e.g., a touch-and-hold gesture) on the touch-sensitive surface (e.g., finger gesture 501, FIGS. 5A-5H). While detecting the predefined gesture on the touch-sensitive surface, the electronic device enters a map rotation mode (e.g., FIG. 5A-5I). While in the map rotation mode, the electronic device detects the rotation of the electronic device with at least one of the one or more orientation sensors (e.g., orientation sensors 168, FIG. 1A), and determines the respective orientation of the electronic device. The respective orientation is distinct from the first orientation. While detecting the rotation of the electronic device, the electronic device updates the first three-dimensional map view with the respective three-dimensional map view (e.g., map views 502-5 through 502-8, FIGS. 5E-5I) of the respective map location (e.g., building 504). The respective three-dimensional map view is viewed from the respective angle distinct from the first angle, wherein the respective angle is determined in accordance with the respective orientation of the electronic device. Having a distinct map rotation mode permits a user to change to a desired map viewpoint while in the map rotation mode, and then maintain the selected map viewpoint in other modes, thereby preventing accidental changes to the displayed map viewpoint.

In some embodiments, the electronic device detects (620) termination of the predefined gesture on the touch-sensitive surface (e.g., the finger touch in finger gesture 501 ceases to be detected on touch screen 112 in FIG. 5J). In response to detecting the termination of the predefined gesture on the touch-sensitive surface, the electronic device exits the map rotation mode.

In some embodiments, the first three-dimensional map view is (622) displayed in one of a portrait orientation and a landscape orientation. While in the map rotation mode, the electronic device detects a rotation of the electronic device from the one of the portrait orientation and the landscape orientation to the other of the portrait orientation and the landscape orientation, and maintains display of the respective three-dimensional map view in the one of the portrait orientation and the landscape orientation despite the rotation of the electronic device from the one of the portrait orientation and the landscape orientation to the other of the portrait orientation and the landscape orientation. In response to exiting from the map rotation mode, the electronic device replaces the respective three-dimensional map view with a rotated three-dimensional map view of the respective map location, wherein the rotated three-dimensional map view is viewed from the respective angle distinct from the first angle. The rotated three-dimensional map view is in the other of the portrait orientation and the landscape orientation. For example, in FIGS. 5H-5I, while finger touch 501 is detected on touch screen 112, device 100 continues to display a map view in the landscape orientation despite the rotation of device 100. Thereafter, in FIGS. 5I-5J, in response to determining that finger gesture 501 is no longer detected on touch screen 112, device 100 replaces the map view in the landscape orientation with a corresponding map view in the portrait orientation.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. For brevity, these details are not repeated here.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6B may be implemented by components depicted in FIGS. 1A-1B. For example, detection operation 604, updating operation 606, and map rotation mode entering operation 618 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 7:
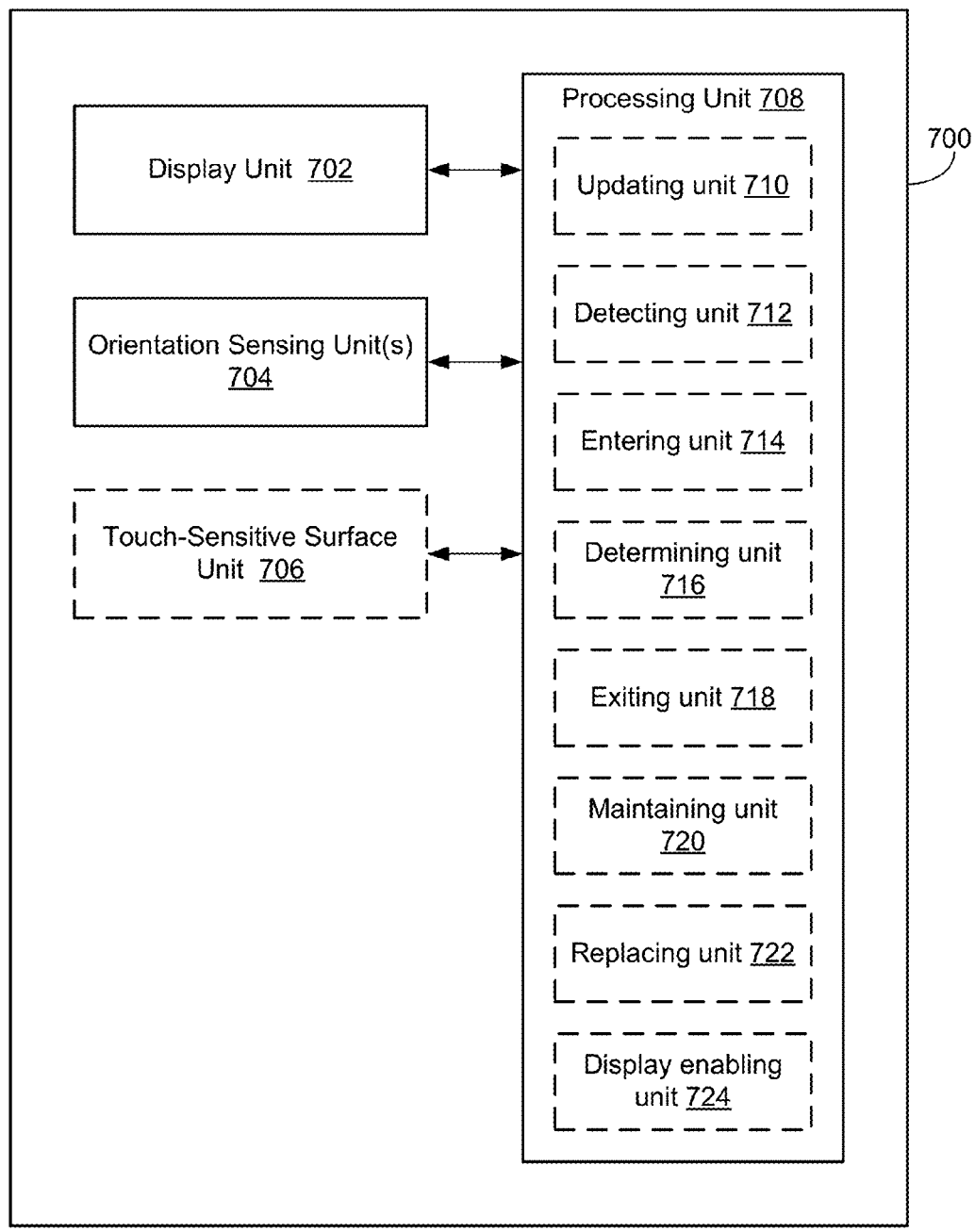
FIG. 7 is a functional block diagram of an electronic device in accordance with some embodiments.

In accordance with some embodiments, FIG. 7 shows a functional block diagram of electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, electronic device 700 includes display unit 702 configured to display a first three-dimensional map view of a respective map location, wherein the first three-dimensional map view is viewed from a first angle while an orientation of electronic device 700 corresponds to a first orientation. Electronic device 700 also includes one or more orientation sensing units 704 configured to detect a rotation of electronic device 700. Electronic device 700 further includes processing unit 708 coupled to display unit 702 and the one or more orientation sensing units 704. In some embodiments, processing unit 708 includes updating unit 710, detecting unit 712, entering unit 714, determining unit 716, exiting unit 718, maintaining unit 720, replacing unit 722, and display enabling unit 724.

Processing unit 708 is configured to, while detecting the rotation of the electronic device (e.g., with one or more orientation sensing units 704), determine a respective orientation of the electronic device, the respective orientation distinct from the first orientation (e.g., determining unit 716); and update the first three-dimensional map view with a respective three-dimensional map view of the respective map location (e.g., updating unit 710), wherein the respective three-dimensional map view is viewed from a respective angle distinct from the first angle. The respective angle is determined in accordance with the respective orientation of the electronic device.

In some embodiments, electronic device 700 includes a touch-sensitive surface unit 706 coupled to processing unit 708. Processing unit 708 is configured to, while enabling display of the first three-dimensional map view on the display unit (e.g., with display enabling unit 724), detect a predefined gesture on the touch-sensitive surface (e.g., with detecting unit 712); and, while detecting the predefined gesture on the touch-sensitive surface, enter a map rotation mode (e.g., with entering unit 714). Processing unit 708 is also configured to, while in the map rotation mode: detect the rotation of the electronic device with at least one of the one or more orientation sensors (e.g., with the one or more orientation sensing unit 704), and determine the respective orientation of the electronic device, wherein the respective orientation is distinct from the first orientation (e.g., with determining unit 716). Processing unit 708 is further configured to, while detecting the rotation of the electronic device, update the first three-dimensional map view with the respective three-dimensional map view of the respective map location (e.g., with updating unit 710), wherein the respective three-dimensional map view is viewed from the respective angle distinct from the first angle, and the respective angle is determined in accordance with the respective orientation of the electronic device.

In some embodiments, processing unit 708 is further configured to: detect termination of the predefined gesture on the touch-sensitive surface (e.g., with detecting unit 712); and, in response to detecting the termination of the predefined gesture on the touch-sensitive surface, exit the map rotation mode (e.g., with exiting unit 718).

In some embodiments, the first three-dimensional map view is displayed in one of a portrait orientation and a landscape orientation. Processing unit 708 is further configured to, while in the map rotation mode: detect a rotation of the electronic device from the one of the portrait orientation and the landscape orientation to the other of the portrait orientation and the landscape orientation (e.g., with the one or more orientation sensing units 704); and maintain display of the respective three-dimensional map view in the one of the portrait orientation and the landscape orientation despite the rotation of the electronic device from the one of the portrait orientation and the landscape orientation to the other of the portrait orientation and the landscape orientation (e.g., with maintaining unit 720).

Processing unit 708 is also configured to, in response to exiting from the map rotation mode, replace the respective three-dimensional map view with a rotated three-dimensional map view of the respective map location (e.g., with replacing unit 722), wherein the rotated three-dimensional map view is viewed from the respective angle distinct from the first angle, and the rotated three-dimensional map view is in the other of the portrait orientation and the landscape orientation.

In some embodiments, a difference between the first angle and the respective angle corresponds to a difference between the respective orientation and the first orientation.

In some embodiments, the respective angle corresponds to the respective orientation of electronic device 700.

In some embodiments, the first angle corresponds to the first orientation of electronic device 700.

In some embodiments, the respective angle is within a predefined range.

In some embodiments, the first three-dimensional map view includes the respective map location in a central area or point of the first three-dimensional map view (e.g., on display unit 702), and the respective three-dimensional map view includes the respective map location in a central area or point of the respective three-dimensional map view (e.g., on display unit 702).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   one or more orientation sensors;
   one or more processors; and
   memory storing one or more programs, wherein the one or more programs are configured to be executed by the one or more processors, the one or more programs including instructions for:
      displaying on the display a first three-dimensional map view of a respective map location, the respective map location displayed in a center of the first three-dimensional map view being viewed from a first angle while an orientation of the electronic device corresponds to a first orientation;
      detecting a rotation of the electronic device with at least one of the one or more orientation sensors, and determining a respective orientation of the electronic device, the respective orientation distinct from the first orientation; and
      in response to detecting the rotation of the electronic device, updating the first three-dimensional map view with a respective three-dimensional map view of the respective map location, the respective map location continuing to be displayed in the center of the respective three-dimensional map view but being viewed from a respective angle distinct from the first angle, wherein the respective angle is determined in accordance with the respective orientation of the electronic device.

2. The device of claim 1, wherein the electronic device includes a touch-sensitive surface, the device including instructions for:
   while displaying the first three-dimensional map view on the display, detecting a predefined gesture on the touch-sensitive surface;
   in response to detecting the predefined gesture on the touch-sensitive surface, entering a map rotation mode;
   while in the map rotation mode:
      detecting the rotation of the electronic device with at least one of the one or more orientation sensors, and determining the respective orientation of the electronic device, the respective orientation distinct from the first orientation; and
      in response to detecting the rotation of the electronic device, updating the first three-dimensional map view with the respective three-dimensional map view of the respective map location, the respective three-dimensional map view being viewed from the respective angle distinct from the first angle, wherein the respective angle is determined in accordance with the respective orientation of the electronic device.

3. The device of claim 2, including instructions for:
   detecting termination of the predefined gesture on the touch-sensitive surface; and,
   in response to detecting the termination of the predefined gesture on the touch-sensitive surface, exiting the map rotation mode.

4. The device of claim 2, wherein the first three-dimensional map view is displayed in one of a portrait orientation and a landscape orientation, the device including instructions for:
   while in the map rotation mode:
      detecting a rotation of the electronic device from the one of the portrait orientation and the landscape orientation to the other of the portrait orientation and the landscape orientation; and
      maintaining display of the respective three-dimensional map view in the one of the portrait orientation and the landscape orientation despite the rotation of the electronic device from the one of the portrait orientation and the landscape orientation to the other of the portrait orientation and the landscape orientation; and
   in response to exiting from the map rotation mode, replacing the respective three-dimensional map view with a rotated three-dimensional map view of the respective map location, the rotated three-dimensional map view being viewed from the respective angle distinct from the first angle, wherein the rotated three-dimensional map view is in the other of the portrait orientation and the landscape orientation.

5. The device of claim 1, wherein a difference between the first angle and the respective angle corresponds to a difference between the respective orientation and the first orientation.

6. The device of claim 1, wherein the respective angle corresponds to the respective orientation of the electronic device.

7. The device of claim 6, wherein the first angle corresponds to the first orientation of the electronic device.

8. The device of claim 1, wherein the respective angle is within a predefined range.

9. A method, comprising:
   at an electronic device with a display and one or more orientation sensors:
      displaying on the display a first three-dimensional map view of a respective map location, the respective map location displayed in a center of the first three-dimensional map view being viewed from a first angle while an orientation of the electronic device corresponds to a first orientation;
      detecting a rotation of the electronic device with at least one of the one or more orientation sensors, and determining a respective orientation of the electronic device, the respective orientation distinct from the first orientation; and in response to detecting the rotation of the electronic device, updating the first three-dimensional map view with a respective three-dimensional map view of the respective map location, the respective map location continuing to be displayed in the center of the respective three-dimensional map view but being viewed from a respective angle distinct from the first angle, wherein the respective angle is determined in accordance with the respective orientation of the electronic device.

10. The method of claim 9, wherein the electronic device includes a touch-sensitive surface, the method further comprising:

while displaying the first three-dimensional map view on the display, detecting a predefined gesture on the touch-sensitive surface;

in response to detecting the predefined gesture on the touch-sensitive surface, entering a map rotation mode;

while in the map rotation mode:

detecting the rotation of the electronic device with at least one of the one or more orientation sensors, and determining the respective orientation of the electronic device, the respective orientation distinct from the first orientation; and in response to detecting the rotation of the electronic device, updating the first three-dimensional map view with the respective three-dimensional map view of the respective map location, the respective three-dimensional map view being viewed from the respective angle distinct from the first angle, wherein the respective angle is determined in accordance with the respective orientation of the electronic device.

11. The method of claim 10, further comprising:

detecting termination of the predefined gesture on the touch-sensitive surface; and, in response to detecting the termination of the predefined gesture on the touch-sensitive surface, exiting the map rotation mode.

12. The method of claim 10, wherein the first three-dimensional map view is displayed in one of a portrait orientation and a landscape orientation, the method further comprising:

while in the map rotation mode:

detecting a rotation of the electronic device from the one of the portrait orientation and the landscape orientation to the other of the portrait orientation and the landscape orientation; and maintaining display of the respective three-dimensional map view in the one of the portrait orientation and the landscape orientation despite the rotation of the electronic device from the one of the portrait orientation and the landscape orientation to the other of the portrait orientation and the landscape orientation; and in response to exiting from the map rotation mode, replacing the respective three-dimensional map view with a rotated three-dimensional map view of the respective map location, the rotated three-dimensional map view being viewed from the respective angle distinct from the first angle, wherein the rotated three-dimensional map view is in the other of the portrait orientation and the landscape orientation.

13. The method of claim 9, wherein a difference between the first angle and the respective angle corresponds to a difference between the respective orientation and the first orientation.

14. The method of claim 9, wherein the respective angle corresponds to the respective orientation of the electronic device.

15. The method of claim 14, wherein the first angle corresponds to the first orientation of the electronic device.

16. The method of claim 9, wherein the respective angle is within a predefined range.

17. A non-transitory computer readable storage medium storing one or more programs, the one or more programs comprising instructions, which, when executed by an electronic device with a display and one or more orientation sensors, cause the device to:

display on the display a first three-dimensional map view of a respective map location, the respective map location displayed in a center of the first three-dimensional map view being viewed from a first angle while an orientation of the electronic device corresponds to a first orientation;

detect a rotation of the electronic device with at least one of the one or more orientation sensors, and determine a respective orientation of the electronic device, the respective orientation distinct from the first orientation; and in response to detecting the rotation of the electronic device, update the first three-dimensional map view with a respective three-dimensional map view of the respective map location, the respective map location continuing to be displayed in the center of the respective three-dimensional map view but being viewed from a respective angle distinct from the first angle, wherein the respective angle is determined in accordance with the respective orientation of the electronic device.

18. The medium of claim 17, wherein the electronic device includes a touch-sensitive surface, the one or more programs including further instructions that cause the device to:

while displaying the first three-dimensional map view on the display, detect a predefined gesture on the touch-sensitive surface;

in response to detecting the predefined gesture on the touch-sensitive surface, enter a map rotation mode;

while in the map rotation mode:

detect the rotation of the electronic device with at least one of the one or more orientation sensors, and determining the respective orientation of the electronic device, the respective orientation distinct from the first orientation; and in response to detecting the rotation of the electronic device, update the first three-dimensional map view with the respective three-dimensional map view of the respective map location, the respective three-dimensional map view being viewed from the respective angle distinct from the first angle, wherein the respective angle is determined in accordance with the respective orientation of the electronic device.

19. The medium of claim 18, wherein the one or more programs include further instructions that cause the device to:

detect termination of the predefined gesture on the touch-sensitive surface; and, in response to detecting the termination of the predefined gesture on the touch-sensitive surface, exit the map rotation mode.

20. The medium of claim 18, wherein the first three-dimensional map view is displayed in one of a portrait orientation and a landscape orientation, the one or more programs including further instructions that cause the device to:

while in the map rotation mode:

detect a rotation of the electronic device from the one of the portrait orientation and the landscape orientation to the other of the portrait orientation and the landscape orientation; and maintain display of the respective three-dimensional map view in the one of the portrait orientation and the landscape orientation despite the rotation of the electronic device from the one of the portrait orientation and the landscape orientation to the other of the portrait orientation and the landscape orientation; and in response to exiting from the map rotation mode, replace the respective three-dimensional map view with a rotated three-dimensional map view of the respective map location, the rotated three-dimensional map view being viewed from the respective angle distinct from the first angle, wherein the rotated three-dimensional map view is in the other of the portrait orientation and the landscape orientation.

21. The medium of claim 17, wherein a difference between the first angle and the respective angle corresponds to a difference between the respective orientation and the first orientation.

22. The medium of claim 17, wherein the respective angle corresponds to the respective orientation of the electronic device.

23. The medium of claim 22, wherein the first angle corresponds to the first orientation of the electronic device.

24. The medium of claim 17, wherein the respective angle is within a predefined range.

25. A graphical user interface on an electronic device with a display and one or more orientation sensors, a memory, and one or more processors to execute one or more programs stored in the memory, the graphical user interface comprising:

a first three-dimensional map view of a respective map location, the respective map location displayed in a center of the first three-dimensional map view being viewed from a first angle while an orientation of the electronic device corresponds to a first orientation;

wherein:

in response to detecting a rotation of the electronic device with at least one of the one or more orientation sensors, a respective orientation of the electronic device is determined, the respective orientation distinct from the first orientation; and in response to detecting the rotation of the electronic device, the first three-dimensional map view is updated with a respective three-dimensional map view of the respective map location, the respective map location continuing to be displayed in the center of the respective three-dimensional map view but being viewed from a respective angle distinct from the first angle, wherein the respective angle is determined in accordance with the respective orientation of the electronic device.

* * * * *